United States Patent [19]

Zaczek

[11] 4,327,417
[45] Apr. 27, 1982

[54] ANTENNA SCAN PATTERN GENERATOR

[75] Inventor: Thomas E. Zaczek, Littleton, Colo.

[73] Assignee: Martin Marietta Corporation, Bethesda, Md.

[21] Appl. No.: 157,104

[22] Filed: Jun. 6, 1980

[51] Int. Cl.³ .......................... G01S 7/40; G06F 15/20
[52] U.S. Cl. .................... 364/578; 343/17.7; 343/100 AP
[58] Field of Search ............. 364/578, 579; 343/17.7, 343/100 SA, 100 AP; 434/1, 2, 3, 4, 5

[56] References Cited

U.S. PATENT DOCUMENTS

| 3,403,247 | 9/1968 | Morgan et al. | 364/578 X |
|---|---|---|---|
| 3,452,353 | 6/1969 | Neuendorf | 343/17.7 |
| 3,452,354 | 6/1969 | Neuendorf | 343/17.7 |
| 3,540,046 | 11/1970 | Falk | 343/17.7 |
| 3,555,546 | 1/1971 | Bertram | 434/4 X |
| 3,634,886 | 1/1972 | Synowka | 343/17.7 X |
| 3,719,812 | 3/1973 | Bishop et al. | 364/579 |
| 3,732,569 | 5/1973 | Collins | 343/100 AP |
| 3,982,244 | 9/1976 | Ward et al. | 343/17.7 X |
| 4,000,491 | 12/1976 | Bishop | 343/17.7 |
| 4,008,476 | 2/1977 | Evans, Jr. | 343/17.7 |
| 4,163,234 | 7/1979 | Beno et al. | 343/17.7 |
| 4,204,342 | 5/1980 | Linfield | 343/17.7 X |

Primary Examiner—Felix D. Gruber
Attorney, Agent, or Firm—Brady, O'Boyle & Gates

[57] ABSTRACT

Disclosed is a means for synthesizing many different antenna patterns with different beamwidths and elliptical symmetries, being derived from a common data set corresponding to a planar cut or slice of an arbitrary antenna pattern which is stored in an addressable memory such as a programmable read only memory (PROM). A pattern surface or envelope is modeled by an algorithm which takes generated azimuth and elevation values simulating a desired scanning motion from which a memory address is produced according to a predetermined mathematical relationship including factors which determine the degree of ellipticity as well as the beamwidth relative to the stored planar cut of the arbitrary antenna pattern.

15 Claims, 12 Drawing Figures

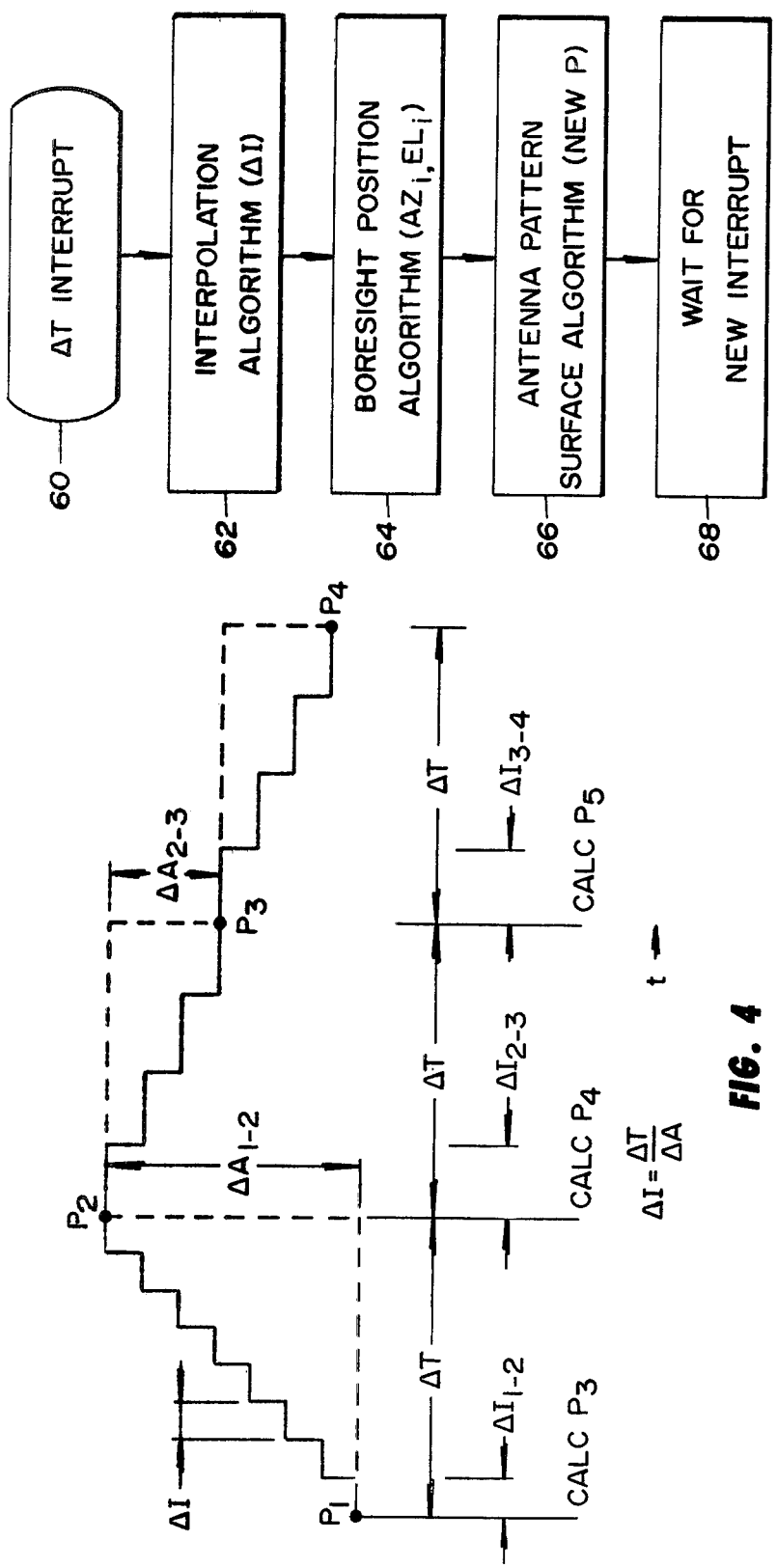

INTERPOLATION ALGORITHM

CIRCULAR SCAN

BIDIRECTIONAL AZIMUTH SECTOR SCAN

PATTERN SURFACE ATTENUATION ALGORITHM

GEOMETRY RELATIONSHIPS IN ELEVATION

PATTERN ø

PATTERN 1

ANTENNA SCAN PATTERN GENERATOR

BACKGROUND OF THE INVENTION

The present invention relates generally to signal generators and more particularly to radar antenna pattern signal generators utilized in electronic test equipment to simulate time varying emissions from a number of different transmitters and where the relative positions of the transmitters or emitters from the receiver may also be varying with time. This type of environment with time varying transmitter parameters and/or time varying transmitter/receiver distances and relative spatial relationships is often referred to a dynamic electromagnetic environment.

One known type of apparatus for simulating in real time the electromagnetic signal received from an RF transmitter in a dynamic electromagnetic environment is disclosed in U.S. Pat. No. 3,719,812 entitled "Dynamic Electromagnetic Environment Simulator" issued to G. Bishop et al. on Mar. 6, 1970 and assigned to the assignee of the present invention. Disclosure therein is a general purpose computer wherein there is stored data relating to the varying relative positions of the environmental emitters and the equipment under test, the parameters of the emission from environmental emitters, the transfer functions of the simulator test equipment hardware, and the characteristics of the equipment under test upstream of the point of insertion of the simulated signals from the test set. The computer is programmed to use this information to provide on a medium, preferably a magnetic tape, binary coded digital information to control the generation by the test equipment signals in real time that would be received by the equipment under test from the emitters in the environment. In performing a simulation, the tape is placed in the test system hardware and run, whereupon the test equipment hardware translates the signals on the tape into a signal simulating the result, at the equipment under test, of the environmental emitters, which resulting signal is fed into the equipment under test as it is being operated in a normal manner. While the simulated radiation signal is being fed in the equipment under test, an operator of the equipment can observe the effect of environmental radiation upon its operation.

More recently fusible link read only memories have been utilized for producing an electronical signal of the desired antenna pattern. Such apparatus is disclosed in U.S. Pat. No. 4,800,476, entitled "Digital Antenna Pattern Generator For Radar Simulation" issued to A. B. Evans on Feb. 15, 1977. In the simulation apparatus disclosed there is a requirement that every pattern to be simulated must first be fed into memory and thereafter read out on demand. It can be seen therefore that such a system requires a relatively large storge capacity since each antenna design, inter alia, must have its own individual or respective "signature" stored in the memory.

It is an object of the present invention therefore to provide a digital antenna pattern generator which obviates the necessity of storing each and every antenna pattern which is to be simulated.

It is another object of the present invention to provide a digital antenna pattern generator which significantly reduces the data storage requirement by synthesizing many different patterns from one generalized pattern stored in memory.

SUMMARY OF THE INVENTION

Briefly these and other objects of the present invention are achieved by a system which synthesizes in real time a three dimensional power pattern surface or envelope which is cirlularly or elliptically symmetrical about boresight from an arbitrarilly generated two dimensional antenna characteristic which is stored in a programmable read only memory (PROM) as a data set. A microprocessor coupled to the read only memory is operable upon receiving input parameters from a programmer such as a support computer to implement a desired boresight motion algorithm and a pattern surface algorithm to generate a lookup value which is utilized to address the memory which accordingly reads out a digital attenuation word from the data set. The microprocessor generates these values in equal sequential operational time intervals. An interpolation algorithm is also implemented in each operational time interval to smooth the transition between successive attenuation values. The pattern surface algorithm utilizes a square root of the sum of the squares calculation based on the instantaneous spatial azimuthal and elevational relationship between the emitter and receiver as well as predetermined beamwidth factors to produce a complex three dimensional pattern surface which is moving in space from a static two dimensional planar pattern cut or slice which is contained in the PROM as an addressable data set.

BRIEF DESCRIPTION OF THE DRAWINGS

The following description of the preferred embodiment will become understood when taken in conjunction with the drawings which form a part of this specification and in which:

FIG. 4 is a diagram illustrative of the interpolation algorithm provided by the subject invention;

FIG. 5 is a top level flow diagram illustration of the modal sequence of the algorithms implemented by the subject invention;

DESCRIPTION OF THE PREFERRED EMBODIMENT

The invention described herein is designed primarily for testing an RF receiver which is responsive to a radiation pattern emitted for example from a radar set. Moreover, in such apparatus it has become desirable to subject the receiver to various types of antenna patterns and scan types. It is to this task that the subject invention is directed.

Figure 1:
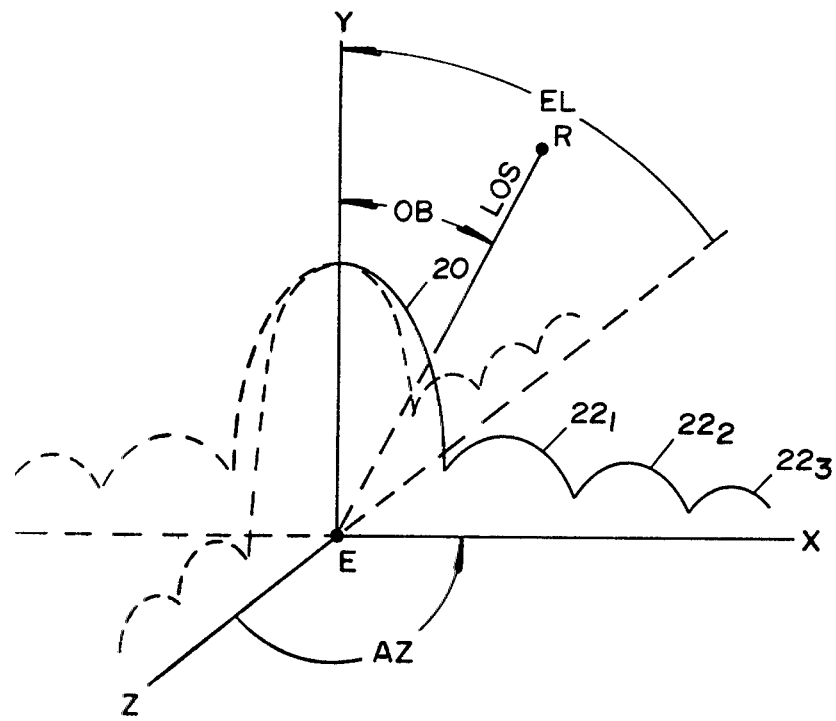
FIG. 1 is a diagram illustrative of a three dimensional radar antenna pattern emitted from a transmitter which is in spatial relationship with a receiver under test.
Figure 2:
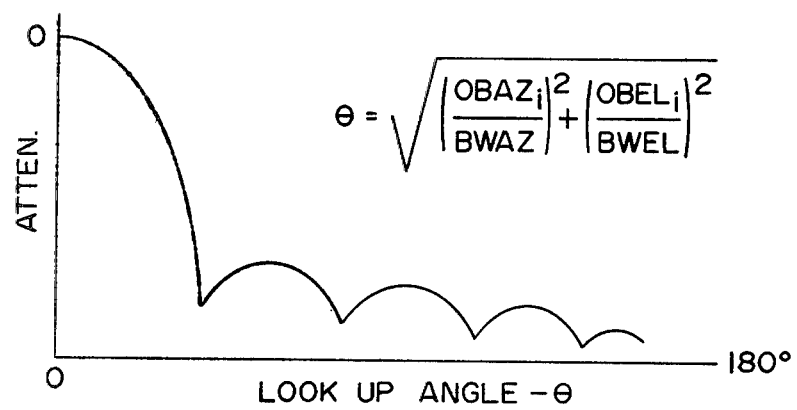
FIG. 2 is a diagram illustrative of a two dimensional planar cut of the antenna pattern shown in FIG. 1 and which is helpful in understanding the subject invention.

Referring now to the drawings and more particularly to FIG. 1 there is shown a three dimensional coordinate axis system in which the X-Y axis defines an elevational plane while the X-Z axis defines an azimuth plane. The reference character E at the origin designates the position of an emitter (transmitter) antenna, not shown, which radiates a three dimensional RF envelope or pattern consisting of a main lobe 20 which has a relatively large amplitude accompanyed by a plurality of lesser powered side lobes $22_1$, $22_2$ etc. This power distribution is typical of all radar emitters; however, the specific shape of the pattern itself is peculiar to each individual type of system and exhibits a "signature" which can be sensed and plotted in a well known fashion. In prior art simulator apparatus each such "signature" is stored and read out upon demand to provide the required test signal. What is significant about the subject invention, however, is that this requirement is obviated by means of apparatus which will operate to synthesize a required output pattern from a generalized typical antenna characteristic created in the X-Y plane. From this two dimensional planar characteristic or "cut" of the antenna pattern which is shown in FIG. 2 a three dimensional pattern will be generated by a synthesis process making an assumption that the resulting pattern will be circularly or elliptically symmetrical about the boresight axis, which constitutes the center line of the main lobe 20, and which in FIG. 1 comprises the Y axis.

FIG. 1 additionally includes a reference character R which designates a position in space of a receiver, not shown, whose line of sight axis to the emitter E is designated by LOS with the off boresight angle being designated by OB. The receiver in effect senses the RF amplitude (attenuation) at the point where the LOS intersects the three dimensional envelope or surface pattern of the radiated beam. As is well known if the relative positions of the emitter E and the receiver R are fixed any type of scan motion effected by the antenna at E will cause the angle OB to change in accordance with the scan pattern generated.

The present invention has for its purpose synthesizing an antenna surface pattern for seventeen (17) types of scans which are listed in the following Table 1.

TABLE 1

| Type Number | List of Scan Types<br>Description |
|---|---|
| 0 | Circular |
| 1 | Bidirectional Azimuth Sector |
| 2 | Bidirectional Elevation Sector |
| 3 | Unidirectional Azimuth Sector |

TABLE 1-continued

| Type Number | List of Scan Types<br>Description |
|---|---|
| 4 | Unidirectional Elevation Sector |
| 5 | Unidirectional Azimuth Sector with Dead Time |
| 6 | Unidirectional Elevation Sector with Dead Time |
| 7 | Steady |
| 8 | Conic |
| 9 | Bidirectional Raster |
| 10 | Unidirectional Raster with Dead Time |
| 11 | Palmer Sector |
| 12 | Spiral |
| 13 | Bidirectional Helical |
| 14 | Unidirectional Helical |
| 15 | Sequential Lobing |
| 16 | Palmer Circular |

By storing a single data set of digital values in an addressable memory of a planar two dimensional cut, for example, as shown in FIG. 2 whose address comprises a lookup angle, $\theta$, a character which results from a square root of the sum of the squares calculation (FIG. 2) of instantaneous off boresight angles for azimuth and elevation i.e. $OBAZ_i$ and $OBEL_i$ and beamwidth factors BWAZ and BWEL, the latter being adapted to determine ellipticity, a plurality of different pattern surfaces can be synthesized in increments of real time as will become evident as this discussion continues. If for example the beamwidth factors range from integer values 1 to 10, a total of 100 unique pattern surfaces can be generated from each data set of the planar cut.

Figure 3:
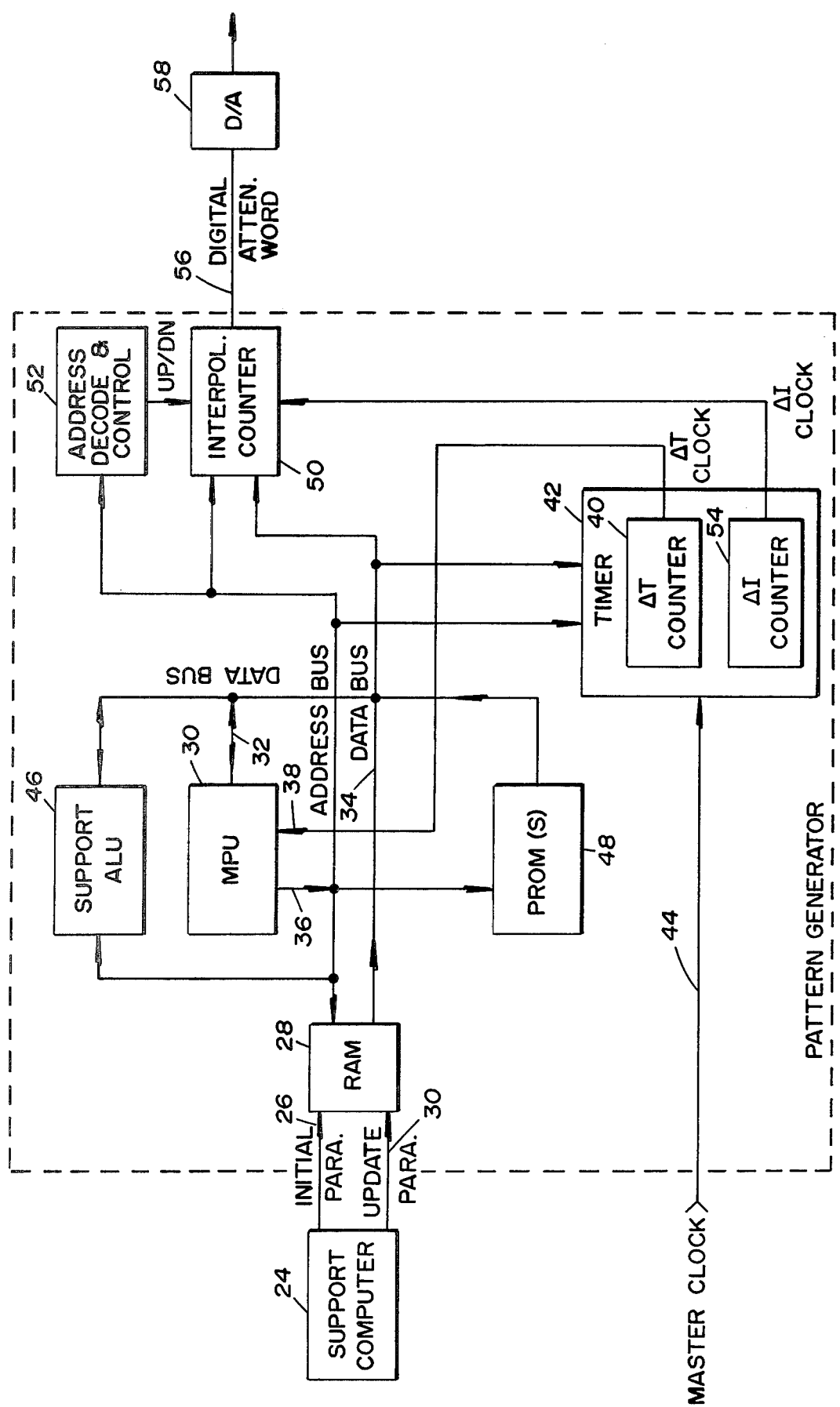
FIG. 3 is an electrical block diagram illustrative of the preferred embodiment of the subject invention.

Referring now to FIG. 3 there is disclosed in block diagramatic form apparatus for modeling a desired antenna boresight scanning motion and surface pattern of an emitter dictated from an external programming device such as a support computer 24. The computer 24, a typical example of which is shown in the above referenced U.S. Pat. No. 3,719,812 is adapted to provide a system "scenario" in that it has within its capability the outputting a set of parameters indicative of a desired shape of surface pattern, scan type, scan rate, beamwidth factor, sector sizes, etc. which are provided as a set of initial parameters on data bus 26 to a random access memory (RAM) 28 each time a new operational mode is selected at the support computer. Additionally, a set of update parameters which consists of, for example, a set of offset angles OB for azimuth and elevation are continuously supplied to the RAM 28 via data line 30.

Figure 11:
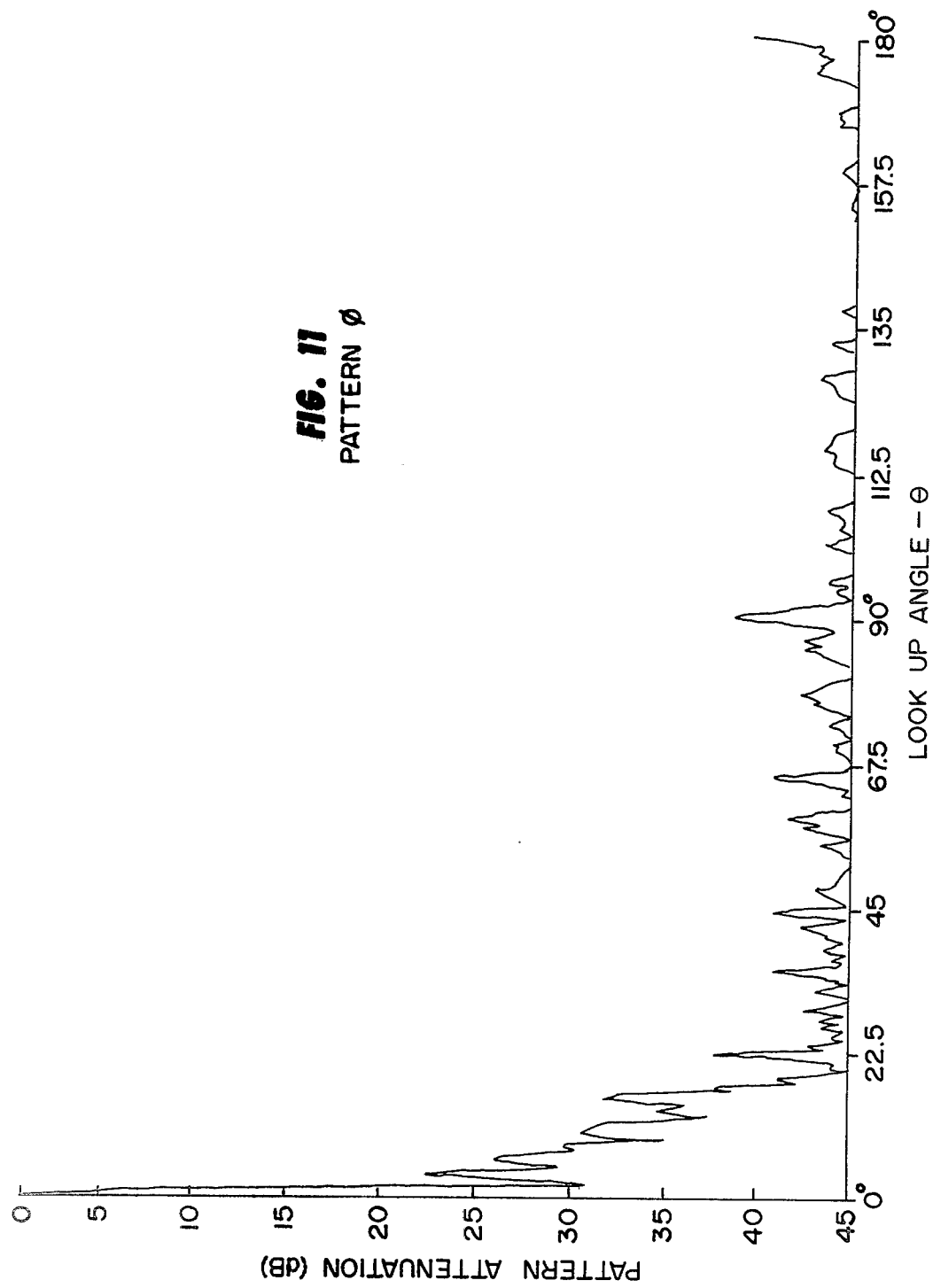
FIG. 11 is a diagram illustrative of a first arbitrary two dimensional planar cut of an antenna beam surface pattern stored in the PROM shown in FIG. 3 and utilized for synthesizing a first plurality of antenna patterns.
Figure 12:
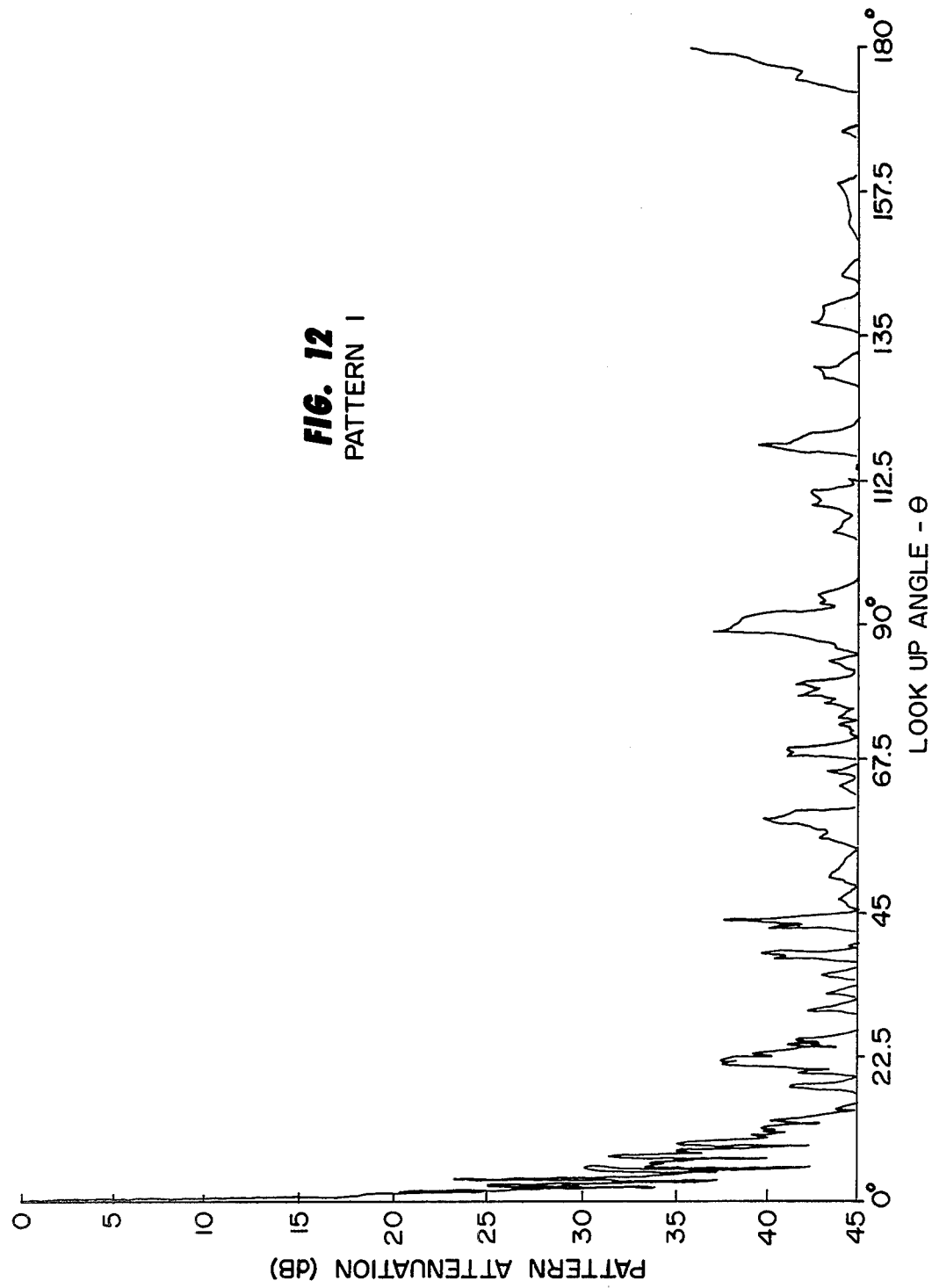
FIG. 12 is illustrative of a second arbitrary two dimensional planar cut of an antenna beam surface pattern stored in the PROM for synthesizing a second plurality of antenna patterns.

The RAM 28 is adapted to operate so as to feed the parameters inputted thereto from the support computer 24 to a microprocessor unit (MPU) 30, typically comprising a type 6802 MPU via a bidirectional input/output data bus 32 and a system data bus 34. The MPU 30 has an output address bus 36 which couples to a system address bus 37 and a clock bus 38. A real time interrupt processing clock pulse is periodically applied to the clock bus 38 from a $\Delta T$ counter 40 located in an interval timer 42. The timer 42 is adapted to receive an external master clock signal on line 44. This clock signal when desirable may be generated in the support computer 24. The MPU 30 operates in conjunction with a computational speed enhancing support arithmetic logic unit (ALU) 46 to perform two major functions during each operational time interval $\Delta T$ established by the interrupt clock pulses generated in counter 40. These two functions comprise implementing a boresight motion algorithm and a beam pattern surface algorithm and are controlled by program instruction sets contained in at least one programmable read only memory (PROM) 48, e.g. a type 2716 erasable EPROM. The PROM 48 in fact contains instructions for modeling the seventeen types of scans noted in Table 1. In addition program instruction sets are included in the PROM 48 which establish an operational logic for the system. The PROM 48 also contains at least one data set defining an arbitrarilly generated two dimensional planar beam surface pattern having certain predetermined characteristics which is typically illustrative of a generalized type of pattern, meaning that it is not specific to any one individual known pattern. One such pattern cut is shown in FIG. 11. In the instant embodiment of the subject invention a second data set for another generalized pattern cut is shown in FIG. 12 is also contained as a data set in the PROM 48. Where the storage capability of one PROM is insufficient to contain the stored program sets referred to above two or more additional PROMS may be utilized in a well known fashion.

As mentioned above, the MPU 30, the ALU 40 and the PROM 48 are adapted to first model a predetermined boresight motion for a particular scan type and secondly model a predetermined antenna pattern surface in three dimensional form from one of the two dimensional pattern sets stored in the PROM 48. What is ultimately produced is a digital output word P which is an attenuation word simulating in real time the RF value of the emitted radiation that the receiver (FIG. 1) would sense. Additionally an interpolation algorithm is also implemented by the subject invention during each $\Delta T$ period for smoothing the transition between successive P values. This is provided by an interpolation counter 50 shown in FIG. 3 and comprises an up/down counter whose count direction is controlled by an address decode and control circuit 52. The interpolation counter 50 moreover is driven by means of a $\Delta I$ counter 52 which generates a variable clock output governed in accordance with a calculation performed in the MPU 30 every interrupt operational period $\Delta T$.

Figure 6:
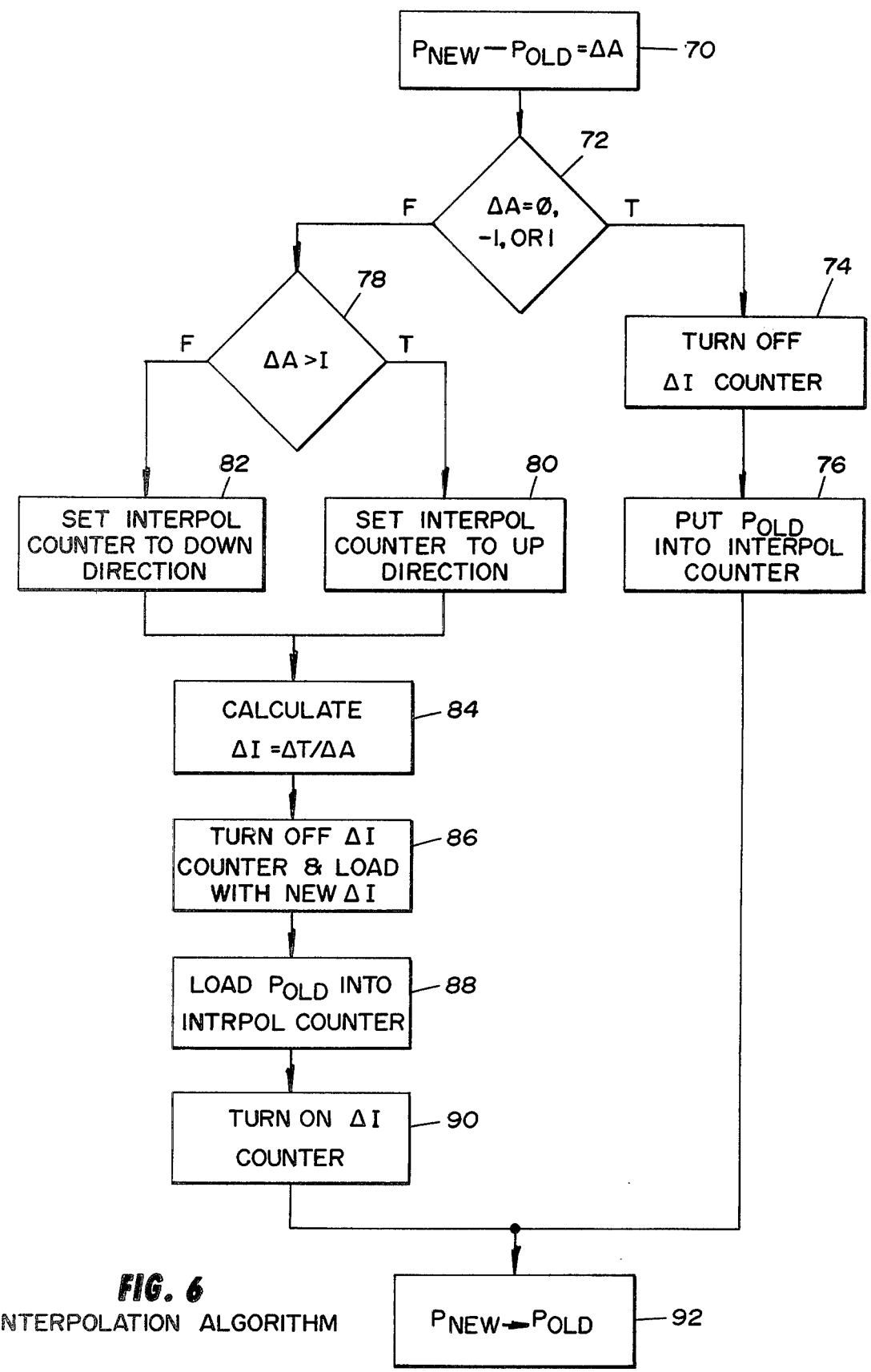
FIG. 6 is a flow diagram illustrative of the interpolation algorithm referred to in FIG. 5.

Referring now to FIG. 4, shown therein is a diagram illustrating the interpolation algorithm. $P_1$, $P_2$, $P_3$ and $P_4$ represent four successive attenuation values produced in respective operational time intervals $\Delta T$. It is to be noted that the amplitude change $\Delta A$ between values $P_1$ and $P_2$ is relatively greater than between the values $P_2$ and $P_3$ also $P_3$ and $P_4$. The interpolation process operates to effect a linear ramp of discrete equal amplitude steps at a rate $\Delta I$ determined by the difference between successive P values. Such a determination results from a calculation performed in the MPU 30 according to the equation $\Delta I = \Delta T/\Delta A$. The result of this calculation causes the MPU 30 to address the $\Delta I$ counter 54 and instruct a $\Delta I$ clock output from the counter 52 to increase or decrease in repetition rate. It should also be noted that in any $\Delta T_i$ period the calculation for $\Delta I$ is made for the two preceeding values of calculated P in the two preceeding $\Delta T$ time periods. This will become evident when FIG. 6 is considered. Thus in any $\Delta T$ time period the interpolation counter 50 will be fed a new value of P from the MPU 30 which will count up or down or remain unchanged. It merely permits the output attenuation word to exhibit a relatively smooth transition between successive calculated digital values of the synthesized pattern surface attenuation. The interpolated output appears on data bus 50 and can, when desirable, be fed to a digital to analog converter 58 which in turn can be utilized to drive an RF generator, not shown.

In operation, the motion and pattern generator shown in FIG. 3 operates in a sequence as shown by the top level flow chart of FIG. 5. There reference numeral 60 designates the beginning of an $i_{th}$ interrupt processing interval $\Delta T$. First the P value interpolation algorithm 62 is performed wherein a $\Delta I$ calculation is made from the two previously calculated P values during the i-1 and i-2 $\Delta T$ intervals in accordance with the procedure outlined in FIG. 4. Following this a boresight motion position algorithm 64 is effected to produce instantaneous azimuth and elevation angle values $AZ_i$ and $EL_i$ which are used in a antenna pattern surface algorithm 66 to generate a new value of P. At the end of the algorithm period the system waits for a new interrupt clock signal as indicated by block 68. Meanwhile the $\Delta I$ counter 54 (FIG. 3) continues to output the $\Delta I$ clock signal to the interpolation counter 50 until the end of the specific $\Delta T$ interval.

Considering now the interpolation algorithm as outlined in FIG. 6 the first step 70 comprises the determination of the difference between the new value of P and the previous value of P following which a query is made as indicated by block 72 as to whether the value $\Delta A$ is equal to 0, $-1$ or $+1$. If this condition exists the output of the interpolation counter 50 as shown in FIG. 3 is caused to remain unchanged. This is effected by turning off the $\Delta I$ counter 54 as indicated in step 74 and putting in the previous or old value of P i.e. $P_{old}$ from the MPU 30 to the interpolation counter 50 as shown in step 76.

If the output of query 72 is false a query 78 is next made to determine whether $\Delta A$ is greater than 1. If so the interpolation counter 54 is set into the "up" direction per step 80. Otherwise, it is set into the "down" direction in step 82. Following this a calculation step 84 is entered into to determine the value of $\Delta I$ whereupon the MPU 30 turns off the $\Delta I$ counter 54 and loads it with a new $\Delta I$ value as shown in step 86. Next the previous value of P i.e. $P_{old}$ is loaded into the interpolation counter 50 in step 88 after which the $\Delta I$ counter 54 is turned on in step 90 which will increment up or down to the new value of P i.e. $P_{new}$ as shown in FIG. 4. Following this a step 92 is entered into whereby $P_{new}$ will become $P_{old}$ in the next $\Delta T$ interrupt interval.

Figure 7A:
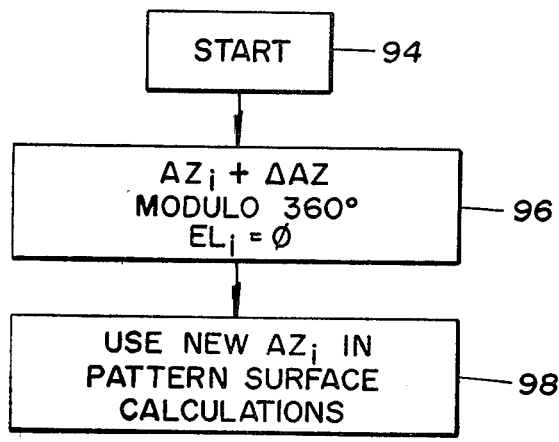
FIGS. 7A and 7B are flow diagrams illustrative of two typical types of antenna scans implemented by the boresight motion algorithms referred to in FIG. 5.

The foregoing interpolation algorithm is ancillary to the more important function of simulating an emitter which is scanning a volume of space in real time relative to the position of the receiver and involves the boresight motion algorithm and the pattern surface attenuation algorithm referred to previously. Of the seventeen types of scans (Table I) desired to be implemented by the subject invention, FIGS. 7A and 7B disclose two typical types of scans, namely a circular scan and a bidirection azimuth sector scan which are disclosed in the respective flow diagrams. Referring to FIG. 7A, the circular scan is relatively simple in that following a start step 94 the MPU program outputs a fixed value of azimuth angle $\Delta AZ$ which is added to the previous instantaneous azimuth angle $AZ_i$ in each $\Delta T$ period for a three hundred and sixty degree (modulo 360°) scan as shown in block 96. For a circular scan the values of the instantaneous elevation angle $EL_i=0$. The new $AZ_i$ values are utilized in the pattern surface calculations to be considered in the algorithms shown in FIG. 8. This is shown as step 98 in FIG. 7A.

Figure 7B:
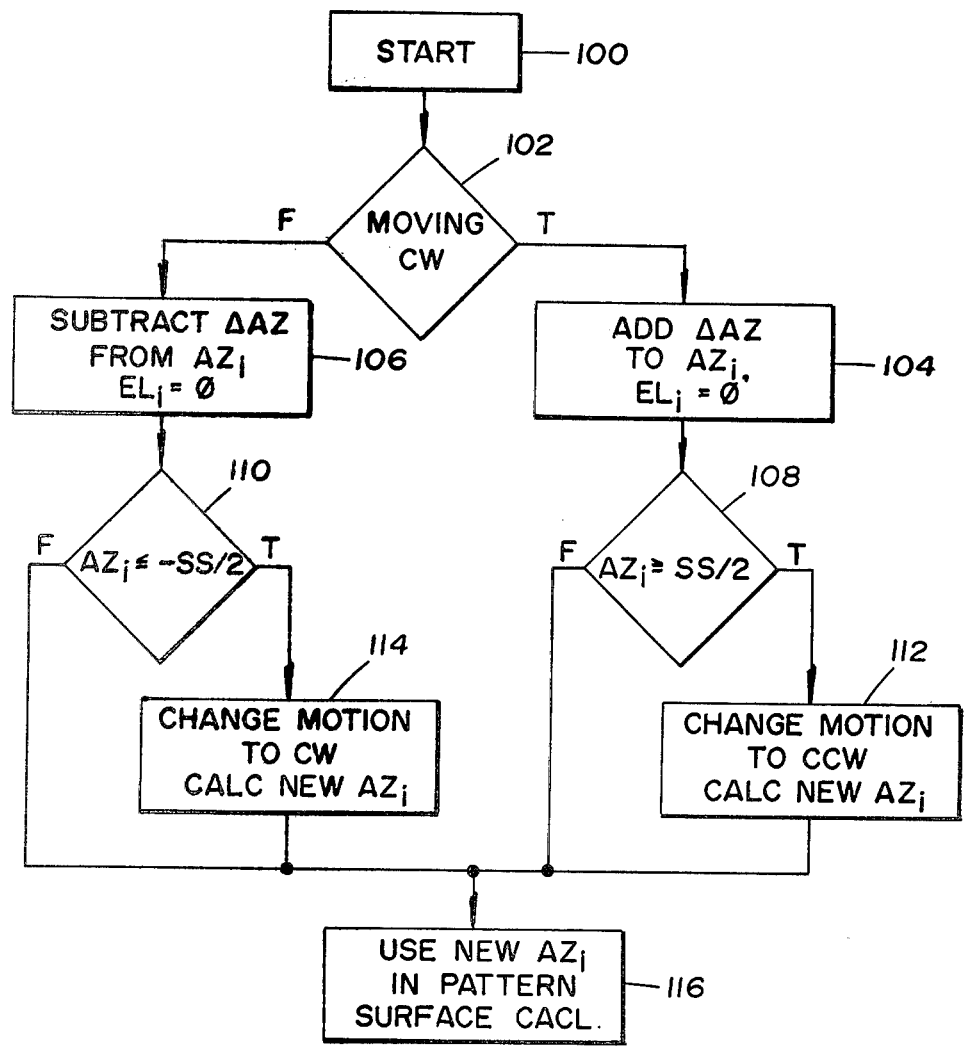
Figure 10:
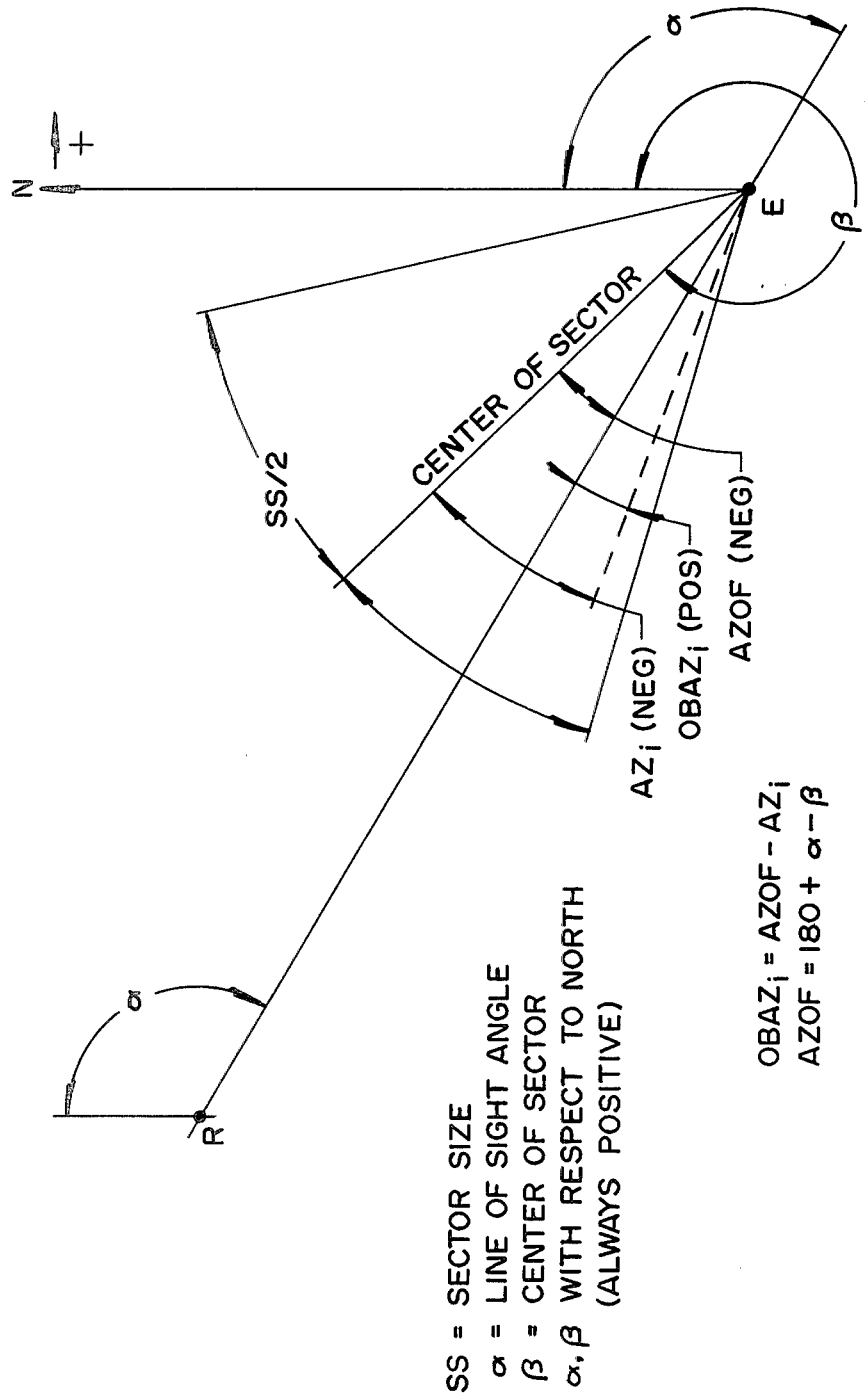
FIG. 10 is a diagram illustrative of the geometrical relationships in azimuth between the emitter and receiver and the pertinent angles utilized in effecting the boresight motion algorithm and the pattern surface algorithm shown in FIGS. 7A and 7B and FIG. 8.

The bidirectional azimuth sector scan as shown in FIG. 7b also involves a situation where the instantaneous elevation angles $EL_i$ are 0; however, it is desired to operate the boresight sweep within the confines of a sector shown in FIG. 10. Following a start step 100 during the $\Delta T$ interval, a query step 102 determines the present scan direction. In steps 104 or 106 the azimuth delta ($\Delta Az$) is either added or subtracted with the $Az_i$ value. The resultant $Az_i$ after these steps 104 or 106 may be outside or equal to bound $\pm SS/2$ and queries 110 and 108 determine this. If the $Az_i$ value is outside the $SS/2$ bound steps 114 or 112 will calculate a new $Az_i$ value that is within the $SS/2$ boundary so that no $Az_i$ values used in step 116 will ever be outside the sector boundaries. As an example, consider a sector of 20 degrees (so that $SS/2 = 10$ degrees) and a $\Delta Az$ of 3 degrees. If $Az_i$ were equal to 9 degrees upon entry to step 104, the result of the addition in step 104 would be a new $Az_i$ of 12 degrees. In query 108 this would be tested against $SS/2$ and the TRUE path would be taken to step 112 where a new $Az_i$ value of 8 degrees would be calculated. The amount that the $Az_i$ value exceeds the sector bound (in this case 2 degrees) is subtracted from $SS/2$ in step 112 to determine the $Az_i$ used in step 116. If step 114 were encountered, the amount that $Az_i$ exceeds the sector bound would be added to $-SS/2$ to determine the new $Az_i$ used in step 116.

Figure 9:
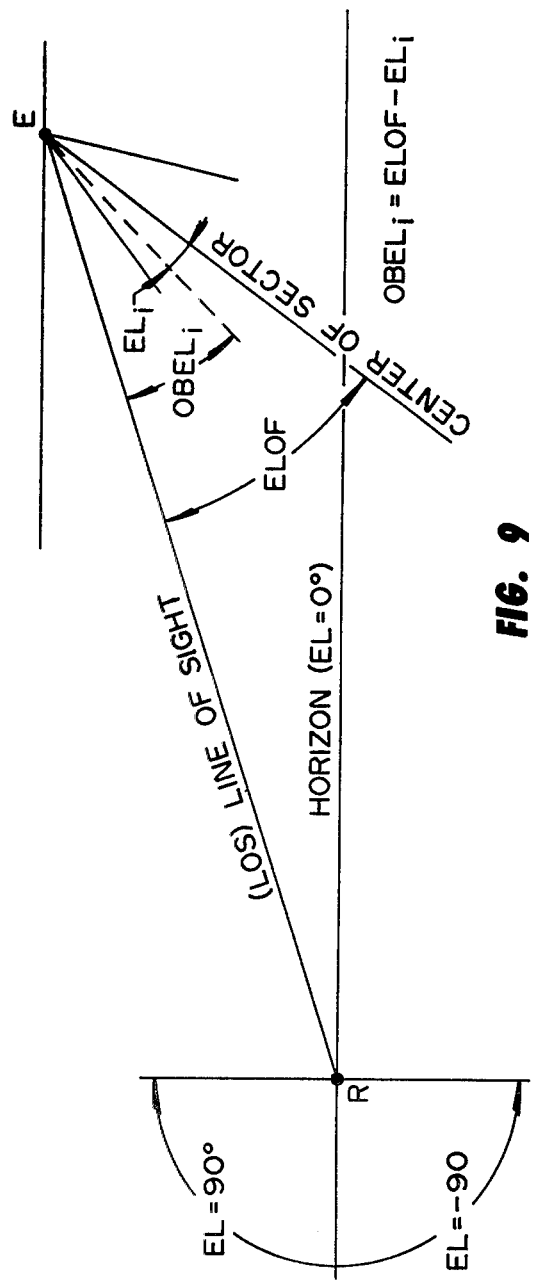
FIG. 9 is a diagram illustrating the geometrical relationships in elevation between an emitter and receiver under test and the pertinent angles utilized in effecting boresight motion algorithm and the pattern surface algorithm shown in FIGS. 7A and B and FIG. 8.

It should be pointed out that the instantaneous values of $EL_i$ and $AZ_i$ as shown by the geometrical relationships in FIGS. 9 and 10 comprise boresight directions relative to the center of the sector irrespective of the line of sight (LOS).

Figure 8:
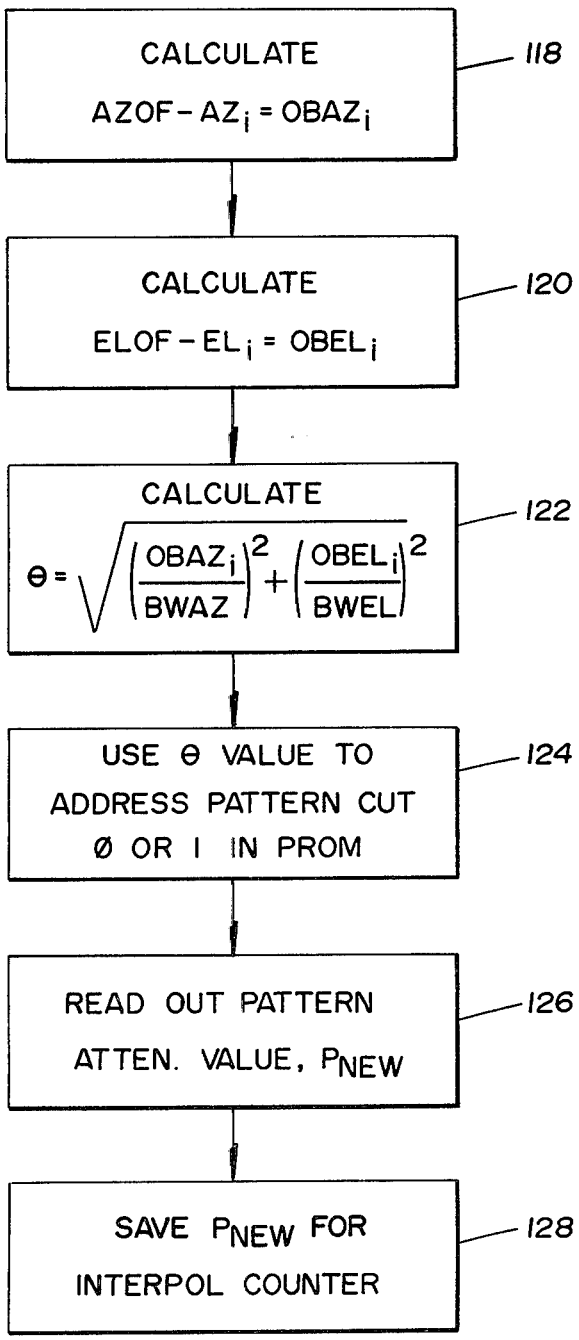
FIG. 8 is a flow diagram illustrative of the pattern surface algorithm referred to in FIG. 5.

Considering now the pattern surface attenuation algorithm shown in FIG. 8, the line of sight offset from the center of the sector is considered first by having the offset angles AZOF and ELOF shown in FIGS. 9 and 10 respectively applied as update parameters to the MPU 30 from the support computer 24 (FIG. 3) via the RAM 28 from which instantaneous off boresight angles $OBAZ_i$ and $OBEL_i$ are calculated in steps 118 and 120 wherein the respective instantaneous azimuth and elevation angles $AZ_i$ and $EL_i$ are subtracted from respective offset angles AZOF and ELOF inputted thereto. Next a very important calculation is made in the MPU 30 along with the ALU 46 involving the instantaneous off boresight angles in both azimuth $OBAZ_i$ and elevation $OBEL_i$ as well as beamwidth factors BWAZ and BWEL. These values are utilized in a square root of the sum of the squares calculation shown in step 122 which results in an angle look up value $\theta$ being generated. This value is used in step 124 to address either data set for the pattern 0 or pattern 1 shown in FIGS. 11 and 12 which are stored in the PROM 48 (FIG. 3) and which results in a new attenuation value $P_{new}$ being read out as evidenced in step 126. Finally the new P value is saved as shown in step 128 for the interpolation algorithm (FIG. 6) which will begin after the next $\Delta T$ interrupt. Thus during each $\Delta T$ interrupt interval a value of P is calculated in accordance with the offset angles and the desired beamwidth factors which affect ellipticity to synthesize a desired surface pattern for the relative position in space between the emitter and receiver for a particular scan type. What is significant however, is that many three dimensional surface patterns can be developed from a single two dimensional pattern which is stored in a programmable read only memory.

Thus what has been shown and described is a relatively simple, yet efficient means of simulating in real time the RF amplitude variations of a symmetrical radiated electromagnetic signal beam pattern as seen by a receiver located in space with respect to a transmitting antenna having a predetermined type of scanning motion.

Appendix I and II attached hereto comprise a specific program listings for effecting the algorithms shown in FIG. 5, while Appendix III comprises program listings for the two antenna patterns 0 and 1 shown in FIGS. 11 and 12 and the PROM 48 for synthesizing any desired antenna pattern. These Appendices are intended to form a part of this specification.

While the present invention has thus far been described with what is considered to be a preferred embodiment of the subject invention, it should be understood that desirable attenuation and modifications may be resorted to without departing from the spirit and scope of the invention which is defined in the following claims.

APPENDIX I

```
00001                        NAM    SCAMP9   *******4/14/79*******
00002      9000   A SCNTBL   EQU    $9000
00003      0000   A SCR0     EQU    $00
00004      0001   A SCR1     EQU    $01
00005      0002   A SCR2     EQU    $02
00006      0003   A STMKU    EQU    $03    SEC DELTA T MULT(K) LOWER
00007      0004   A STMKL    EQU    $04
00008      0005   A SECSSU   EQU    $05    SEC SECTOR SIZE UPPER
00009      0006   A SECSSL   EQU    $06
00010      0007   A PTMJU    EQU    $07    PRIMARY DELTA T MULT (J)UP
00011      0008   A PTMJL    EQU    $08
00012      0009   A SSADU    EQU    $09    SEC SCAN ANGLE DELTA UPPER
00013      000A   A SSADL    EQU    $0A
00014      000B   A SCAD     EQU    $0B    SCAN DIRECTION FLAGS
00015      000C   A STPAT    EQU    $0C    SCAN TYPE/PATTERN ID
00016      000D   A PRSSU    EQU    $0D    PRIM SECTOR SIZE UPPER
00017      000E   A PRSSL    EQU    $0E
00018      000F   A DELAZ    EQU    $0F    DELAY ANGLE AZ
00019      0010   A DELELV   EQU    $10    DELAY ANGLE EL
00020      0011   A DZAU     EQU    $11    DEAD ZONE(OR CONIC)ANGLE U
00021      0012   A DZAL     EQU    $12
```

```
00022    0013  A  BWAZ    EQU  $13    BEAMWIDTH FACTOR AZ
00023    0014  A  BWELV   EQU  $14    BEAMWIDTH FACTOR EL
00024    0015  A  PSADU   EQU  $15    PRIM. SCAN ANGLE DELTA UPPE
00025    0016  A  PSADL   EQU  $16
00026    0017  A  SCR17   EQU  $17
00027    0018  A  SCR18   EQU  $18
00028    0019  A  DELTU   EQU  $19    DELTA T UPPER
00029    001A  A  DELTL   EQU  $1A    DELTA T LOWER
00030    001B  A  SCR1B   EQU  $1B
00031    001C  A  ELOF    EQU  $1C    ELEVATION OFFSET
00032    001D  A  AZOF    EQU  $1D    AZIMUTH OFFSET
00033    001E  A  ATTCO   EQU  $1E    ATTEN TO CUTOFF
00034    001F  A  SCR1F   EQU  $1F
00035    0020  A  AZIU    EQU  $20    INST. AZ UPPER
00036    0021  A  AZIL    EQU  $21
00037    0022  A  ELVIU   EQU  $22    INST. EL UPPER
00038    0023  A  ELVIL   EQU  $23
00039    0024  A  AZOFU   EQU  $24    AZ OFFSET UPPER
00040    0025  A  AZOFL   EQU  $25
00041    0026  A  ELOFU   EQU  $26    EL OFFSET UPPER
00042    0027  A  ELOFL   EQU  $27
00043    0028  A  PASS    EQU  $28    PASS THROUGH INIT CALC(0,1
00044    0029  A  ATTNEW  EQU  $29    NEW ATTEN VALUE
00045    002A  A  ATTOLD  EQU  $2A    OLD ATTEN VALUE
00046    002B  A  SCR2B   EQU  $2B
00047    002C  A  OBAZU   EQU  $2C    OFF-BORESITE AZUP
00048    002D  A  OBAZL   EQU  $2D
00049    002E  A  OBELVU  EQU  $2E
00050    002F  A  OBELVL  EQU  $2F
00051    0030  A  RESDU   EQU  $30    F. P. RESIDUE
00052    0031  A  RESDL   EQU  $31
00053    0032  A  LUAU    EQU  $32    LOOK-UP ANGLE UP
00054    0033  A  LUAL    EQU  $33
00055    0034  A  ATRES   EQU  $34    F. P. RESIDUE FOR T/A=I CAL
00056    0035  A  PATNO   EQU  $35    PATTERN #
00057    0036  A  ELRES   EQU  $36    FLOAT. PT. RES.
00058    0037  A  AZRES   EQU  $37
00059    0038  A  TIMEU   EQU  $38
00060    0039  A  TIMEL   EQU  $39    MODIFIED DELTA T
00061    003A  A  TYPEU   EQU  $3A    ADDRESS(U) OF SCAN TYPE PR
00062    003B  A  TYPEL   EQU  $3B
00063    003C  A  BETAIU  EQU  $3C    ROTATIONAL ANGLE FOR CONSC
00064    003D  A  BETAIL  EQU  $3D
00065                ****ADDRESSES OF COMPRESSED ANTENNA
00066                ****PATTERN SEGMENTS*******
00067    0040  A  PTABL0  EQU  $40
00068    0041  A  SCR41   EQU  $41
00069    0042  A  PTABL1  EQU  $42
00070    0043  A  SCR43   EQU  $43
00071    0044  A  PTABL2  EQU  $44
00072    0045  A  SCR45   EQU  $45
00073    0046  A  PTABL3  EQU  $46
00074    0047  A  SCR47   EQU  $47
00075    0048  A  PTABL4  EQU  $48
00076    0049  A  SCR49   EQU  $49
00077    004A  A  CONE    EQU  $4A    SCALED CONIC ANGLE
00078    004B  A  CONRES  EQU  $4B
00079    004C  A  CKWISE  EQU  $4C
00080    004D  A  SIZ2U   EQU  $4D
00081    004E  A  SIZ2L   EQU  $4E    SECTOR SIZE/2
00082    004F  A  UPDOWN  EQU  $4F
00083    00C0  A  ISRFF   EQU  $C0    INIT SR FF
00084    00C1  A  LDMX    EQU  $C1    LOAD MULT. X REG.
00085    00C2  A  CNDRF   EQU  $C2    CLR NEW DATA READY FLG(NDR
00086    00C3  A  LINC    EQU  $C3    LOAD INTERPOLATION CNTR.
```

```
00087            00C4  A LCPU    EQU     $C4        LOAD COMPARATOR UPPER
00088            00C5  A LCPL    EQU     $C5        LOAD COMPARATOR LOWER
00089            00C6  A RPRU    EQU     $C6        READ PRODUCT REG. UPPER
00090            00C7  A RPRL    EQU     $C7         "      "     "   LOWER
00091            00CC  A SQRCU   EQU     $CC        LD SQR ROOT CMPARE UPPER
00092            00CD  A SQRCL   EQU     $CD        LD  "    "    "    LOWER
00093            00D0  A RSAR    EQU     $D0        READ SUCC. APPROX REG
00094            00DD  A SPDV    EQU     $DD        SINGLE PRECISION DIVIDE
00095            00E0  A CTIFF   EQU     $E0        CLR THRESHOLD INHIBIT FF
00096            00E2  A INIT1   EQU     $E2        CLR TIFF AND CLR NDRF
00097            00E8  A STIFF   EQU     $E8        SET THRESHOLD INH FF
00098            00E9  A ERDISP  EQU     $E9        ERROR(STATUS)DISPLAY
00099            00F0  A LDMY    EQU     $F0        LOAD MULT Y REG
00100            00F3  A CLFLT   EQU     $F3        CLEAR FAULT FLAG
00101            00F4  A STRIG   EQU     $F4        SCOPE TRIGGER
00102            00F8  A RNDRF   EQU     $F8        READ NDRF
00103            00E3  A LINC1   EQU     $E3        LINC AND CLR TIFF
00104            00EB  A LINC2   EQU     $EB        LINC AND SET TIFF
00105            00FA  A INIT2   EQU     $FA        CLR NDRF AND READ NDRF
00106            00F1  A SQR     EQU     $F1        MULT NUMBER BY ITSELF
00107A 9800                      ORG     $9800
00108A 9800 8E 007F  A RIP      LDS     #$7F        INIT STK. PNTR
00109A 9803 86 7E    A           LDAA    #$7E
00110A 9805 97 C3    A           STAA    LINC       MAX ATTEN TO OUTPUT
00111A 9807 98 E8    A           EORA    STIFF      SET THRESH INHIB FF
00112A 9809 5F         T0        CLRB               START OF TEST#0
00113A 980A D7 E9    A           STAB    ERDISP     OUTPUT TO STAT. DISP
00114A 980C 96 FA    A           LDAA    INIT2      CLR NDRF AND READ NDRF
00115A 980E 84 01    A           ANDA    #1
00116A 9810 27 02 9814           BEQ     T1         BRIF OK
00117A 9812 4F                   CLRA
00118A 9813 36                   PSHA               PUT ERR#0 ON STK
00119A 9814 5C         T1        INCB               START TEST1
00120A 9815 D7 E9    A           STAB    ERDISP
00121A 9817 CE 007E  A           LDX     #$7E
00122A 981A 86 AA    A           LDAA    #$AA
00123A 981C A7 00    A T10       STAA    0,X        WRITE AA INTO 7E TO 00
00124A 981E 09                   DEX
00125A 981F 26 FB 981C           BNE     T10
00126A 9821 CE 007E  A           LDX     #$7E
00127A 9824 A6 00    A T11       LDAA    0,X        READ INT RAM
00128A 9826 81 AA    A           CMPA    #$AA
00129A 9828 26 05 982F           BNE     T12        BRIF ERROR
00130A 982A 09                   DEX
00131A 982B 26 F7 9824           BNE     T11
00132A 982D 20 01 9830           BRA     T2         GO START TEST2
00133A 982F 37         T12       PSHB               PUT ERR1 ON STK
00134A 9830 5C         T2        INCB               START TEST2
00135A 9831 D7 E9    A           STAB    ERDISP
00136A 9833 CE 007D  A           LDX     #$7D
00137A 9836 86 55    A           LDAA    #$55
00138A 9838 A7 00    A T20       STAA    0,X
00139A 983A 09                   DEX
00140A 983B 26 FB 9838           BNE     T20
00141A 983D CE 007D  A           LDX     #$7D
00142A 9840 A6 00    A T21       LDAA    0,X        READ INT RAM
00143A 9842 81 55    A           CMPA    #$55
00144A 9844 26 05 984B           BNE     T22        BRIF ERROR
00145A 9846 09                   DEX
00146A 9847 26 F7 9840           BNE     T21
00147A 9849 20 01 984C           BRA     T3         GO START TEST3
00148A 984B 37         T22       PSHB               PUT ERR2 ON STK
00149A 984C 5C         T3        INCB               START TEST3
00150A 984D D7 E9    A           STAB    ERDISP
00151A 984F B6 8FFF  A           LDAA    #8FFF      READ LAST LOC IN PATT ROM
```

```
00152A 9852 81 AA      A          CMPA    #$AA
00153A 9854 27 01 9857            BEQ     T4          BRIF OK TO TEST4
00154A 9856 37                    PSHB
00155A 9857 5C            T4      INCB                START OF TEST4
00156A 9858 D7 E9      A          STAB    ERDISP
00157A 985A B6 97FF    A          LDAA    $97FF       READ LAST LOC OF ROM P2
00158A 985D 81 55      A          CMPA    #$55
00159A 985F 27 01 9862            BEQ     T5          BRIF OK
00160A 9861 37                    PSHB
00161A 9862 5C            T5      INCB                START OF TEST5
00162A 9863 D7 E9      A          STAB    ERDISP
00163A 9865 86 01      A          LDAA    #1
00164A 9867 97 F0      A          STAA    LDMY
00165A 9869 4F                    CLRA
00166A 986A 97 C1      A  T50     STAA    LDMX        DO 1X(N)
00167A 986C D6 C7      A          LDAB    RPRL        GET RESULT
00168A 986E 11                    CBA                 1X(N)=N?
00169A 986F 26 05 9876            BNE     T51         BRIF ERR
00170A 9871 4C                    INCA                NEXT N
00171A 9872 26 F6 986A            BNE     T50
00172A 9874 20 03 9879            BRA     T6
00173A 9876 C6 05      A  T51     LDAB    #5
00174A 9878 37                    PSHB                PUT ERR5 ON STK
00175A 9879 C6 06      A  T6      LDAB    #6
00176A 987B D7 E9      A          STAB    ERDISP
00177A 987D 86 FF      A          LDAA    #$FF
00178A 987F 97 C1      A          STAA    LDMX
00179A 9881 5F                    CLRB
00180A 9882 D7 F0      A  T60     STAB    LDMY        DO 255X(N)
00181A 9884 DE C6      A          LDX     RPRU        GET RESULT
00182A 9886 DF 00      A          STX     SCR0
00183A 9888 17                    TBA
00184A 9889 9B 01      A          ADDA    SCR1        ADD N TO LSP
00185A 988B 24 03 9890            BCC     T61
00186A 988D 7C 0000    A          INC     SCR0        ADD CARRY TO MSP
00187A 9890 D1 00      A  T61     CMPB    SCR0        255*N+N=256*N?
00188A 9892 26 05 9899            BNE     T62         BRIF ERROR
00189A 9894 5C                    INCB                NEXT N
00190A 9895 26 EB 9882            BNE     T60
00191A 9897 20 03 989C            BRA     T7
00192A 9899 C6 06      A  T62     LDAB    #6
00193A 989B 37                    PSHB                PUT ERR6 ON STACK
00194A 989C C6 07      A  T7      LDAB    #7          START OF TEST 7
00195A 989E D7 E9      A          STAB    ERDISP
00196A 98A0 CE 00FF    A          LDX     #$00FF
00197A 98A3 86 FF      A          LDAA    #$FF
00198A 98A5 C6 01      A          LDAB    #1
00199A 98A7 D7 F0      A          STAB    LDMY
00200A 98A9 DF C4      A  T70     STX     LCPU        START N/1
00201A 98AB 09                    DEX
00202A 98AC 01                    NOP                 WAIT FOR ALU
00203A 98AD 01                    NOP                 WAIT FOR ALU
00204A 98AE D6 D0      A          LDAB    RSAR        GET RESULT
00205A 98B0 11                    CBA                 IS N/1=N?
00206A 98B1 26 05 98B8            BNE     T71         BRIF ERROR
00207A 98B3 4A                    DECA                NEXT N
00208A 98B4 26 F3 98A9            BNE     T70
00209A 98B6 20 03 98BB            BRA     T8          GOTO TEST 8
00210A 98B8 C6 07      A  T71     LDAB    #7
00211A 98BA 37                    PSHB                PUT ERR7 ON STACK
00212A 98BB C6 08      A  T8      LDAB    #8
00213A 98BD D7 E9      A          STAB    ERDISP
00214A 98BF 86 01      A          LDAA    #1
00215A 98C1 97 F1      A  T82     STAA    SQR         DO N*N
00216A 98C3 DE C6      A          LDX     RPRU        GET RESULT
```

```
00217A 98C5 DF CC    A          STX    SQRCU    DO SQR ROOT
00218A 98C7 01                  NOP             WAIT FOR ALU
00219A 98C8 01                  NOP
00220A 98C9 01                  NOP
00221A 98CA 01                  NOP
00222A 98CB D6 D0    A          LDAB   RSAR     GET RESULT
00223A 98CD 11                  CBA             (N*N)^.5=N?
00224A 98CE 26 05 98D5          BNE    T81      BRIF ERROR
00225A 98D0 4C                  INCA
00226A 98D1 26 EE 98C1          BNE    T82      NEXT N
00227A 98D3 20 03 98D8          BRA    T9       GOTO TEST9
00228A 98D5 C6 08    A  T81     LDAB   #8
00229A 98D7 37                  PSHB            PUT ERR8 ON STACK
00230A 98D8 C6 09    A  T9      LDAB   #9
00231A 98DA D7 E9    A          STAB   ERDISP
00232A 98DC CE AAAA  A          LDX    #$AAAA
00233A 98DF FF 8002  A          STX    $8002    WRITE INTO TIMER#1
00234A 98E2 FE 8002  A          LDX    $8002    READ FR TIMER1
00235A 98E5 8C AAAA  A          CPX    #$AAAA
00236A 98E8 26 10 98FA          BNE    T90      BRIF ERROR
00237A 98EA CE 5555  A          LDX    #$5555
00238A 98ED FF 8004  A          STX    $8004    WRITE INTO TIMER2
00239A 98F0 FE 8004  A          LDX    $8004    READ TIMER 2
00240A 98F3 8C 5555  A          CPX    #$5555
00241A 98F6 26 02 98FA          BNE    T90
00242A 98F8 20 01 98FB          BRA    TA       GOTO TEST#A
00243A 98FA 37          T90     PSHB            PUT ERR9 ON STACK
00244A 98FB 01          TA      NOP             NO TEST A YET!!!
00245A 98FC 30          RIP1    TSX             SP+1 TO X; SEE IF ERR MADE
00246A 98FD 8C 0080  A          CPX    #$80     IF STCK WASN'T PUSHED THEN
00247A 9900 26 03 9905          BNE    RIP2     BRIF ERROR FOUND IN ANY TE
00248A 9902 98 F3    A          EORA   CLFLT
00249A 9904 3E                  WAI             WAIT WITH DISPLAY BLANKED
00250A 9905 30          RIP2    TSX             SP+1 TO X
00251A 9906 A6 00    A  R0      LDAA   0,X
00252A 9908 97 E9    A          STAA   ERDISP   OUTPUT ERR# TO DISP
00253A 990A DF 00    A          STX    SCR0     SAVE UNTIL AFTER TIMING LO
00254A 990C CE 0287  A          LDX    #647     START OF TIMING LOOP(1 SEC
00255A 990F 4F          R2      CLRA
00256A 9910 4C          R1      INCA
00257A 9911 26 FD 9910          BNE    R1
00258A 9913 09                  DEX
00259A 9914 26 F9 990F          BNE    R2
00260A 9916 DE 00    A          LDX    SCR0     END OF LOOP; RESTORE X
00261A 9918 08                  INX
00262A 9919 8C 0080  A          CPX    #$80     AT TOP OF MESSAGE STACK?
00263A 991C 26 E8 9906          BNE    R0       BRIF MORE MESSAGES IN STAC
00264A 991E 20 E5 9905          BRA    RIP2     ELSE START DISPLAY CYCLE O
00265A 9920 01          NMINIT  NOP             START OF INIT BLOCK INTERP
00266A 9921 CE 0060  A          LDX    #$60     TOP OF SCRATCH AREA
00267A 9924 97 C2    A          STAA   CNDRF    CLR NDRF
00268A 9926 6F 1F    A  NMI0    CLR    $1F,X    CLR SCRATCH AREA
00269A 9928 09                  DEX
00270A 9929 26 FB 9926          BNE    NMI0
00271A 992B 86 FF    A          LDAA   #$FF
00272A 992D 97 28    A          STAA   PASS     INIT PASS TO-1
00273A 992F 86 01    A          LDAA   #$01
00274A 9931 B7 8001  A          STAA   $8001    EN CONT.REG#1;PTM
00275A 9934 B7 8000  A          STAA   $8000    PRESET PTM
00276A 9937 8E 007F  A          LDS    #$7F     INIT SP
00277A 993A 96 F8    A  NMI1    LDAA   RNDRF    READ NDRF
00278A 993C 84 01    A          ANDA   #$01
00279A 993E 27 FA 993A          BEQ    NMI1     LOOP UNTIL NDRF SET
00280A 9940 97 C2    A          STAA   CNDRF    CLR NDRF
00281A 9942 CE 001F  A          LDX    #$1F
```

```
00282A 9945 A6 80    A NMI2   LDAA   $80,X       GET DATA FR EXT RAM
00283A 9947 A7 00    A        STAA   $0,X        PUT EXT DATA IN INT RAM
00284A 9949 97 C4    A        STAA   LCPU        **DIAGNOSTIC
00285A 994B 09                DEX
00286A 994C 26 F7 9945         BNE   NMI2
00287A 994E DE 19    A        LDX    DELTU       GET DELTA T
00288A 9950 FF 8002  A        STX    $8002       PUT DELTA T IN PTM1
00289A 9953 86 D2    A        LDAA   #$D2        CR1(PTM)INIT
00290A 9955 B7 8000  A        STAA   $8000       EN PTM DELTT CNTR
00291A 9958 DE 19    A        LDX    DELTU       GET DELTA T
00292A 995A DF 38    A        STX    TIMEU
00293A 995C 96 38    A        LDAA   TIMEU
00294A 995E C6 01    A        LDAB   #1
00295A 9960 81 04    A NMI8   CMPA   #$04
00296A 9962 2B 07 996B         BMI   NMI7        BRIF NO SCALE NEC
00297A 9964 44               LSRA               TIMEU/2
00298A 9965 76 0039  A        ROR    TIMEL
00299A 9968 58               ASLB               FP RESIDUE*2
00300A 9969 20 F5 9960         BRA   NMI8
00301A 996B D7 34    A NMI7   STAB   ATRES       SAVE FOR INTERP CALC
00302A 996D 97 38    A        STAA   TIMEU
00303A 996F 96 0C    A        LDAA   STPAT       GET SCAN TYPE PAT#
00304A 9971 44               LSRA
00305A 9972 44               LSRA
00306A 9973 44               LSRA
00307A 9974 44               LSRA
00308A 9975 44               LSRA                0000 0PPP
00309A 9976 97 35    A        STAA   PATNO       SAVE
00310A 9978 27 1C 9996         BEQ   NMI7A       BRIF PAT#0 NEEDED
00311A 997A CE 8A90  A        LDX    #$8A90
00312A 997D DF 40    A        STX    PTABL0
00313A 997F CE 8B90  A        LDX    #$8B90
00314A 9982 DF 42    A        STX    PTABL1
00315A 9984 CE 8C10  A        LDX    #$8C10
00316A 9987 DF 44    A        STX    PTABL2
00317A 9989 CE 8C90  A        LDX    #$8C90
00318A 998C DF 46    A        STX    PTABL3
00319A 998E CE 8D10  A        LDX    #$8D10
00320A 9991 DF 48    A        STX    PTABL4
00321A 9993 7E 99AF  A        JMP    NMI7B
00322A 9996 CE 8800  A NMI7A  LDX    #$8800      START OF PAT #0
00323A 9999 DF 40    A        STX    PTABL0
00324A 999B CE 8900  A        LDX    #$8900
00325A 999E DF 42    A        STX    PTABL1
00326A 99A0 CE 8980  A        LDX    #$8980
00327A 99A3 DF 44    A        STX    PTABL2
00328A 99A5 CE 8A00  A        LDX    #$8A00
00329A 99A8 DF 46    A        STX    PTABL3
00330A 99AA CE 8A80  A        LDX    #$8A80
00331A 99AD DF 48    A        STX    PTABL4
00332A 99AF 96 0C    A NMI7B  LDAA   STPAT
00333A 99B1 84 1F    A        ANDA   #$1F        MASK
00334A 99B3 48               ASLA                *2
00335A 99B4 97 01    A        STAA   SCR1
00336A 99B6 C6 90    A        LDAB   #$90        START OF SCANTYPE TABLE(U)
00337A 99B8 D7 00    A        STAB   SCR0
00338A 99BA DE 00    A        LDX    SCR0
00339A 99BC A6 00    A        LDAA   0,X
00340A 99BE E6 01    A        LDAB   1,X
00341A 99C0 97 3A    A        STAA   TYPEU
00342A 99C2 D7 3B    A        STAB   TYPEL       SAVE
00343A 99C4 C6 10    A        LDAB   #$10
00344A 99C6 D7 F0    A        STAB   LDMY
00345A 99C8 96 10    A        LDAA   DELELV      GET DELAY ANG/16
00346A 99CA 97 C1    A        STAA   LDMX        DELELV*16
00347A 99CC DE C6    A        LDX    RPRU        GET ANSW. FR. ALU
```

```
00348A 99CE DF 22      A              STX     ELVIU      USE AS INITIAL ELV
00349A 99D0 96 0F      A              LDAA    DELAZ      GET DELAY ANG/16
00350A 99D2 97 C1      A              STAA    LDMX       DELAZ*16
00351A 99D4 DE C6      A              LDX     RPRU
00352A 99D6 DF 20      A              STX     AZIU       USE AS INITIAL AZ
00353A 99D8 96 0B      A              LDAA    SCAD       GET SCAN DIRECTION FLAGS
00354A 99DA 84 02      A              ANDA    #2         MASK OFF UP/DOWN BIT
00355A 99DC 97 4F      A              STAA    UPDOWN
00356A 99DE 96 0B      A              LDAA    SCAD
00357A 99E0 84 01      A              ANDA    #1         MASK OFF CW/CCW BIT
00358A 99E2 97 4C      A              STAA    CKWISE
00359A 99E4 96 0E      A              LDAA    PRSSL
00360A 99E6 D6 0D      A              LDAB    PRSSU
00361A 99E8 54                        LSRB
00362A 99E9 46                        RORA               /2
00363A 99EA 97 4E      A              STAA    SIZ2L
00364A 99EC D7 4D      A              STAB    SIZ2U      SECTOR SIZE/2
00365A 99EE 96 9D      A              LDAA    $9D        GET INITIAL AZOF FR EXT RA
00366A 99F0 97 C1      A              STAA    LDMX
00367A 99F2 C6 10      A              LDAB    #16
00368A 99F4 D7 F0      A              STAB    LDMY       SCALE UP
00369A 99F6 DE C6      A              LDX     RPRU
00370A 99F8 DF 24      A              STX     AZOFU      INITIAL AZOF
00371A 99FA 96 9C      A              LDAA    $9C        INIT ELOF FR EXT RAM
00372A 99FC 97 C1      A              STAA    LDMX
00373A 99FE DE C6      A              LDX     RPRU
00374A 9A00 DF 26      A              STX     ELOFU
00375A 9A02 20 16 9A1A                BRA     TIMINT
00376A 9A04 2B 6F 9A75 TIM1           BMI     TIM8
00377A 9A06 96 29      A              LDAA    ATTNEW
00378A 9A08 97 C3      A              STAA    LINC
00379A 9A0A 97 2A      A              STAA    ATTOLD
00380A 9A0C 7C 0028    A              INC     PASS
00381A 9A0F 20 64 9A75                BRA     TIM8
00382A 9A11 4F         TIM4           CLRA
00383A 9A12 B7 8001    A              STAA    $8001      SHUT OFF I CLK
00384A 9A15 D7 C3      A              STAB    LINC
00385A 9A17 7E 9A71    A              JMP     TIM7
00386A 9A1A 01         TIMINT         NOP                START OF RTI PROCESSING
00387A 9A1B 96 28      A              LDAA    PASS
00388A 9A1D 2F E5 9A04                BLE     TIM1       BRIF FIRST 2 PASSES
00389A 9A1F 96 2A      A              LDAA    ATTOLD
00390A 9A21 90 1E      A              SUBA    ATTCO      ATTOLD-ATTCO
00391A 9A23 2B 05 9A2A                BMI     TIM2       BR. IF ABOVE THRESH
00392A 9A25 98 E8      A              EORA    STIFF      SET TIFF
00393A 9A27 7E 9A2C    A              JMP     TIM3
00394A 9A2A 98 E0      A TIM2         EORA    CTIFF
00395A 9A2C D6 2A      A TIM3         LDAB    ATTOLD
00396A 9A2E 96 0C      A              LDAA    STPAT      GET SCAN TYPE PARAM
00397A 9A30 84 1F      A              ANDA    #$1F       MASK OUT PAT#
00398A 9A32 81 0F      A              CMPA    #15        SEE IF SEQUENTIAL LOBING S
00399A 9A34 27 DB 9A11                BEQ     TIM4       SKIP INTERP IF SCAN#15
00400A 9A36 96 29      A              LDAA    ATTNEW
00401A 9A38 10                        SBA                NEW-OLD>A
00402A 9A39 2A 0A 9A45                BPL     TIM5
00403A 9A3B 40                        NEGA
00404A 9A3C 81 01      A              CMPA    #$01
00405A 9A3E 27 D1 9A11                BEQ     TIM4
00406A 9A40 C4 7F      A              ANDB    #$7F
00407A 9A42 7E 9A52    A              JMP     TIM6
00408A 9A45 81 02      A TIM5         CMPA    #2
00409A 9A47 2B C8 9A11                BMI     TIM4
00410A 9A49 01                        NOP
00411A 9A4A 01                        NOP
00412A 9A4B 81 01      A              CMPA    #$01
```

```
00413A 9A4D 27 C2 9A11        BEQ   TIM4
00414A 9A4F 01                NOP
00415A 9A50 CA 80     A       ORAB  #$80          SET TO UP
00416A 9A52 48           TIM6 ASLA                DELTA A *2
00417A 9A53 97 F0     A       STAA  LDMY
00418A 9A55 DE 38     A       LDX   TIMEU         GET MODIFIED DELTA T
00419A 9A57 DF C4     A       STX   LCPU          START DIV; T/A
00420A 9A59 4F                CLRA
00421A 9A5A B7 8001   A       STAA  $8001         SHUT OFF I CLK
00422A 9A5D D7 C3     A       STAB  LINC          LOAD ATTOLD INTO OUT
00423A 9A5F D6 34     A       LDAB  ATRES         GET RESIDUE
00424A 9A61 96 D0     A       LDAA  RSAR          GET RESULT OF DIV
00425A 9A63 D7 F0     A       STAB  LDMY
00426A 9A65 97 C1     A       STAA  LDMX          DO RESIDUE*I'
00427A 9A67 DE C6     A       LDX   RPRU          GET PRODUCT
00428A 9A69 FF 8004   A       STX   $8004         LOAD I CLK CNTR
00429A 9A6C C6 83     A       LDAB  #$83          PTM2 INIT CONSTANT
00430A 9A6E F7 8001   A       STAB  $8001         TURN ON I CLK
00431A 9A71 96 29     A  TIM7 LDAA  ATTNEW
00432A 9A73 97 2A     A       STAA  ATTOLD
00433A 9A75 DE 3A     A  TIM8 LDX   TYPEU         GET START ADDR. OF SCAN TY
00434A 9A77 6E 00     A       JMP   0,X           GO DO SCAN BS MOTION UPDAT
00435                      *START SQR. OF. SUM. OF SQUARES(SOSOS)
00436A 9A79 D6 25     A SOSOS LDAB  AZOFL         DO AZOF-AZ(I)=RESULT
00437A 9A7B D0 21     A       SUBB  AZIL          B HAS RESULT(L)
00438A 9A7D 96 24     A       LDAA  AZOFU
00439A 9A7F 92 20     A       SBCA  AZIU          A HAS RESULT(U)
00440A 9A81 2A 06 9A89        BPL   SOS1
00441A 9A83 53                COMB                MAKE RESULT POS
00442A 9A84 43                COMA
00443A 9A85 CB 01     A       ADDB  #1
00444A 9A87 89 00     A       ADCA  #0
00445A 9A89 97 00     A  SOS1 STAA  SCR0          SAVE RESULT(U)
00446A 9A8B 44                LSRA
00447A 9A8C 44                LSRA
00448A 9A8D 44                LSRA
00449A 9A8E 81 03     A       CMPA  #$03
00450A 9A90 27 33 9AC5        BEQ   S15
00451A 9A92 81 01     A       CMPA  #$01
00452A 9A94 27 1F 9AB5        BEQ   S13
00453A 9A96 81 02     A       CMPA  #$02
00454A 9A98 27 24 9ABE        BEQ   S14
00455A 9A9A 81 00     A       CMPA  #0
00456A 9A9C 27 30 9ACE        BEQ   S12
00457A 9A9E 5F                CLRB                IF RESULT >=720
00458A 9A9F D7 2C     A       STAB  OBAZU         MAKE OBAZ=0
00459A 9AA1 D7 2D     A       STAB  OBAZL
00460A 9AA3 7E 9AEC   A       JMP   S20
00461A 9AA6 C6 02     A  S19  LDAB  #2
00462A 9AA8 7E 9AEC   A       JMP   S20
00463A 9AAB C6 04     A  S1A  LDAB  #4
00464A 9AAD 7E 9AEC   A       JMP   S20
00465A 9AB0 C6 01     A  S17  LDAB  #1
00466A 9AB2 7E 9AEC   A       JMP   S20
00467A 9AB5 4F            S13 CLRA
00468A 9AB6 10                SBA                 360(L)-RESULT(L)=OBAZL
00469A 9AB7 C6 10     A       LDAB  #$10          360(U)
00470A 9AB9 D2 00     A       SBCB  SCR0          360(U)-RESULT(U)=OBAZU
00471A 9ABB 7E 9AD1   A       JMP   S16
00472A 9ABE D6 00     A  S14  LDAB  SCR0
00473A 9AC0 C0 10     A       SUBB  #$10          RESULT(U)-360(U)=OBAZU
00474A 9AC2 7E 9AD1   A       JMP   S16
00475A 9AC5 4F            S15 CLRA
00476A 9AC6 10                SBA                 720(L)-RESULT(L)=OBAZL
00477A 9AC7 C6 20     A       LDAB  #$20
00478A 9AC9 D2 00     A       SBCB  SCR0          720(U)-RESULT(U)=OBAZU
```

```
00479A 9ACB 7E 9AD1    A           JMP    S16
00480A 9ACE 17              S12    TBA
00481A 9ACF D6 00      A           LDAB   SCR0
00482A 9AD1 97 2D      A    S16    STAA   OBAZL
00483A 9AD3 D7 2C      A           STAB   OBAZU    SAVE
00484A 9AD5 96 13      A           LDAA   BWAZ
00485A 9AD7 11                     CBA                BWAZ-OBAZU
00486A 9AD8 22 D6 9AB0             BHI    S17         BRIF BWAZ>OBAZU
00487A 9ADA 27 CA 9AA6             BEQ    S19
00488A 9ADC 48                     ASLA                BWAZ*2
00489A 9ADD 11                     CBA
00490A 9ADE 22 C6 9AA6             BHI    S19         BRIF BWAZ*2>OBAZU
00491A 9AE0 27 C9 9AAB             BEQ    S1A
00492A 9AE2 81 02      A           CMPA   #2          2*BWAZ=2?
00493A 9AE4 26 C5 9AAB             BNE    S1A
00494A 9AE6 C1 04      A           CMPB   #4
00495A 9AE8 2B C1 9AAB             BMI    S1A
00496A 9AEA C6 08      A           LDAB   #8
00497A 9AEC D7 37      A    S20    STAB   AZRES
00498A 9AEE D6 27      A           LDAB   ELOFL
00499A 9AF0 D0 23      A           SUBB   ELVIL       B HAS RESULT(L)
00500A 9AF2 96 26      A           LDAA   ELOFU
00501A 9AF4 92 22      A           SBCA   ELVIU       A HAS RESULT(U)
00502A 9AF6 2A 0D 9B05             BPL    S21
00503A 9AF8 53                     COMB                MAKE RESULT POS
00504A 9AF9 43                     COMA
00505A 9AFA CB 01      A           ADDB   #1
00506A 9AFC 89 00      A           ADCA   #0
00507A 9AFE 97 2E      A    S24    STAA   OBELVU
00508A 9B00 D7 2F      A           STAB   OBELVL
00509A 9B02 7E 9B15    A           JMP    S23
00510A 9B05 81 04      A    S21    CMPA   #4
00511A 9B07 2B F5 9AFE             BMI    S24         BRIF RESULT <90 DEG.
00512A 9B09 97 00      A           STAA   SCR0        SAVE RESULT(U)
00513A 9B0B 4F                     CLRA                180(L)
00514A 9B0C 10                     SBA                 180(L)-RESULT(L)=OBELVL
00515A 9B0D 97 2F      A           STAA   OBELVL
00516A 9B0F C6 08      A           LDAB   #$08        180(U)
00517A 9B11 D2 00      A           SBCB   SCR0        180(U)-RESULT(U)=OBELVU
00518A 9B13 D7 2E      A           STAB   OBELVU
00519A 9B15 96 37      A    S23    LDAA   AZRES
00520A 9B17 81 04      A           CMPA   #4
00521A 9B19 2B 08 9B23             BMI    S22
00522A 9B1B 7E 9B3B    A           JMP    SOS3
00523A 9B1E 86 01      A    S25    LDAA   #1
00524A 9B20 7E 9B35    A           JMP    S28
00525A 9B23 96 14      A    S22    LDAA   BWELV
00526A 9B25 11                     CBA                 OBELVU-BWELV
00527A 9B26 22 F6 9B1E             BHI    S25
00528A 9B28 27 09 9B33             BEQ    S27
00529A 9B2A 81 01      A    S26    CMPA   #1          BW=1?
00530A 9B2C 26 05 9B33             BNE    S27
00531A 9B2E 86 04      A           LDAA   #4
00532A 9B30 7E 9B35    A           JMP    S28
00533A 9B33 86 02      A    S27    LDAA   #2
00534A 9B35 91 37      A    S28    CMPA   AZRES       ELRES-AZRES
00535A 9B37 2A 02 9B3B             BPL    SOS3
00536A 9B39 96 37      A           LDAA   AZRES
00537A 9B3B 97 31      A    SOS3   STAA   RESDL
00538A 9B3D 97 F0      A           STAA   LDMY
00539A 9B3F D6 14      A           LDAB   BWELV
00540A 9B41 D7 C1      A           STAB   LDMX        DO BWEL*RESDL
00541A 9B43 D6 C7      A           LDAB   RPRL        GET RESULT
00542A 9B45 D7 F0      A           STAB   LDMY
00543A 9B47 DE 2E      A           LDX    OBELVU
```

```
00544A 9B49 DF C4     A           STX    LCPU     START OBELV/BWEL*RESDL
00545A 9B4B 01                    NOP             WAIT FOR ALU
00546A 9B4C 01                    NOP
00547A 9B4D 01                    NOP
00548A 9B4E 01                    NOP
00549A 9B4F D6 D0     A           LDAB   RSAR
00550A 9B51 D7 F1     A           STAB   SQR      DO D*D
00551A 9B53 DE C6     A           LDX    RPRU     GET RESULT
00552A 9B55 DF 17     A           STX    SCR17    SAVE
00553A 9B57 97 F0     A           STAA   LDMY
00554A 9B59 D6 13     A           LDAB   BWAZ
00555A 9B5B D7 C1     A           STAB   LDMX     DO BWAZ*RESDL
00556A 9B5D D6 C7     A           LDAB   RPRL     GET RESULT
00557A 9B5F D7 F0     A           STAB   LDMY
00558A 9B61 DE 2C     A           LDX    OBAZU
00559A 9B63 DF C4     A           STX    LCPU     START: OBAZ/BWAZ*RESDL
00560A 9B65 01                    NOP             WAIT FOR ALU
00561A 9B66 01                    NOP
00562A 9B67 01                    NOP
00563A 9B68 01                    NOP
00564A 9B69 D6 D0     A           LDAB   RSAR     GET RESULT,C
00565A 9B6B D7 F1     A           STAB   SQR      DO C*C
00566A 9B6D 96 C7     A           LDAA   RPRL     GET RESULT(L)
00567A 9B6F D6 C6     A           LDAB   RPRU
00568A 9B71 9B 18     A           ADDA   SCR18    C*C+D*D
00569A 9B73 D9 17     A           ADCB   SCR17
00570A 9B75 24 0E 9B85            BCC    SOS4     BRIF<=16 BITS
00571A 9B77 56                    RORB            ELSE DO E*E/4
00572A 9B78 46                    RORA
00573A 9B79 54                    LSRB
00574A 9B7A 46                    RORA
00575A 9B7B D7 CC     A           STAB   SQRCU    START E^1/2
00576A 9B7D 97 CD     A           STAA   SQRCL
00577A 9B7F 78 0031   A           ASL    RESDL    *2
00578A 9B82 7E 9B8C   A           JMP    SOS6
00579A 9B85 D7 CC     A   SOS4    STAB   SQRCU
00580A 9B87 97 CD     A           STAA   SQRCL    START SQR ROOT
00581A 9B89 01                    NOP
00582A 9B8A 01                    NOP             WAIT FOR ALU
00583A 9B8B 01                    NOP
00584A 9B8C 5F            SOS6    CLRB
00585A 9B8D 96 D0     A           LDAA   RSAR     GET ROOT
00586A 9B8F 74 0031   A   S60     LSR    RESDL
00587A 9B92 27 05 9B99            BEQ    S61      BRIF NO SCALING NEEDED
00588A 9B94 48                    ASLA            MULT ROOT*2
00589A 9B95 59                    ROLB
00590A 9B96 7E 9B8F   A           JMP    S60
00591A 9B99 C1 00     A   S61     CMPB   #0
00592A 9B9B 27 11 9BAE            BEQ    S62      PATTERN DECOMPRESSION ALG
00593A 9B9D 54                    LSRB
00594A 9B9E 27 13 9BB3            BEQ    S63
00595A 9BA0 46                    RORA
00596A 9BA1 54                    LSRB
00597A 9BA2 27 15 9BB9            BEQ    S64
00598A 9BA4 46                    RORA
00599A 9BA5 54                    LSRB
00600A 9BA6 27 17 9BBF            BEQ    S65
00601A 9BA8 44                    LSRA
00602A 9BA9 DE 48     A           LDX    PTABL4   START OF SEG4
00603A 9BAB 7E 9BC2   A           JMP    S66
00604A 9BAE DE 40     A   S62     LDX    PTABL0   START OF SEG#0
00605A 9BB0 7E 9BC2   A           JMP    S66
00606A 9BB3 44            S63     LSRA
00607A 9BB4 DE 42     A           LDX    PTABL1
00608A 9BB6 7E 9BC2   A           JMP    S66
00609A 9BB9 44            S64     LSRA
```

```
00610A 9BBA DE 44    A           LDX   PTABL2
00611A 9BBC 7E 9BC2  A           JMP   S66
00612A 9BBF 44          S65      LSRA
00613A 9BC0 DE 46    A           LDX   PTABL3
00614A 9BC2 DF 00    A S66       STX   SCR0
00615A 9BC4 5F                   CLRB
00616A 9BC5 9B 01    A           ADDA  SCR1    ADD IN ADDRESS
00617A 9BC7 97 01    A           STAA  SCR1
00618A 9BC9 D9 00    A           ADCB  SCR0
00619A 9BCB D7 00    A           STAB  SCR0
00620A 9BCD DE 00    A           LDX   SCR0
00621A 9BCF A6 00    A           LDAA  0,X     GET ATTEN FROM TABLE
00622A 9BD1 97 29    A           STAA  ATTNEW  SAVE
00623A 9BD3 96 28    A TIM9      LDAA  PASS
00624A 9BD5 2B 31 9C08           BMI   TIM90
00625A 9BD7 96 F8    A           LDAA  RNDRF   READ NEW DATA READY FLG
00626A 9BD9 84 01    A           ANDA  #1
00627A 9BDB 27 1A 9BF7           BEQ   TIM99   BRIF NOT SET
00628                        *REAL TIME UPDATE PROCESSING*
00629A 9BDD 98 C2    A           EORA  CNDRF   CLR FLAG
00630A 9BDF 96 9D    A           LDAA  $9D     GET NEW AZOF FR EXT RAM
00631A 9BE1 97 C1    A           STAA  LDMX
00632A 9BE3 C6 10    A           LDAB  #$10
00633A 9BE5 D7 F0    A           STAB  LDMY
00634A 9BE7 DE C6    A           LDX   RPRU    GET SCALED UP AZOF
00635A 9BE9 DF 24    A           STX   AZOFU
00636A 9BEB 96 9C    A           LDAA  $9C     GET NEW ELVOF FR EXT RAM
00637A 9BED 97 C1    A           STAA  LDMX    DO *16
00638A 9BEF DE C6    A           LDX   RPRU
00639A 9BF1 DF 26    A           STX   ELOFU
00640A 9BF3 96 9E    A           LDAA  $9E     GET NEW ATTCO FR EXT RAM
00641A 9BF5 97 1E    A           STAA  ATTCO
00642A 9BF7 8E 007F  A TIM99     LDS   #$7F
00643A 9BFA B6 8001  A TIM98     LDAA  $8001   READ PTM STS REG
00644A 9BFD F6 8002  A           LDAB  $8002
00645A 9C00 01                   NOP
00646A 9C01 01                   NOP
00647A 9C02 84 80    A           ANDA  #$80    MASK OFF COMPOS. INTERPT.
00648A 9C04 26 F4 9BFA           BNE   TIM98
00649A 9C06 0E                   CLI
00650A 9C07 3E                   WAI
00651A 9C08 7C 0028  A TIM90     INC   PASS
00652A 9C0B 7E 9A1A  A           JMP   TIMINT
00653                            END
```

APPENDIX II

```
00001                            NAM   SCANT2   4/18/79
00002          9000  A SCNTBL    EQU   $9000
00003          0000  A SCR0      EQU   $00
00004          0001  A SCR1      EQU   $01
00005          0002  A SCR2      EQU   $02
00006          0003  A STMKU     EQU   $03
00007          0004  A STMKL     EQU   $04
00008          0005  A SECSSU    EQU   $05
00009          0006  A SECSSL    EQU   $06
00010          0007  A PTMJU     EQU   $07
00011          0008  A PTMJL     EQU   $08
00012          0009  A SSADU     EQU   $09
00013          000A  A SSADL     EQU   $0A
00014          000B  A SCAD      EQU   $0B
00015          000C  A STPAT     EQU   $0C
00016          000D  A PRSSU     EQU   $0D
00017          000E  A PRSSL     EQU   $0E
```

```
00018              0011  A  DZAU   EQU  $11
00019              0012  A  DZAL   EQU  $12
00020              0015  A  PSADU  EQU  $15
00021              0016  A  PSADL  EQU  $16
00022              0017  A  SCR17  EQU  $17
00023              0018  A  SCR18  EQU  $18
00024              001B  A  SCR1B  EQU  $1B
00025              001F  A  SCR1F  EQU  $1F
00026              0020  A  AZIU   EQU  $20
00027              0021  A  AZIL   EQU  $21
00028              0022  A  ELVIU  EQU  $22
00029              0023  A  ELVIL  EQU  $23
00030              0028  A  PASS   EQU  $28
00031              0029  A  ATTNEW EQU  $29
00032              002B  A  SCR2B  EQU  $2B
00033              003C  A  BETAIU EQU  $3C
00034              003D  A  BETAIL EQU  $3D
00035              0040  A  PTABL0 EQU  $40
00036              0041  A  SCR41  EQU  $41
00037              0042  A  PTABL1 EQU  $42
00038              0043  A  SCR43  EQU  $43
00039              0044  A  PTABL2 EQU  $44
00040              0045  A  SCR45  EQU  $45
00041              0046  A  PTABL3 EQU  $46
00042              0047  A  SCR47  EQU  $47
00043              0048  A  PTABL4 EQU  $48
00044              0049  A  SCR49  EQU  $49
00045              004A  A  CONE   EQU  $4A
00046              004B  A  CONRES EQU  $4B
00047              004C  A  CKWISE EQU  $4C
00048              004D  A  SIZ2U  EQU  $4D
00049              004E  A  SIZ2L  EQU  $4E
00050              004F  A  UPDOWN EQU  $4F
00051              0050  A  SCR50  EQU  $50
00052              0051  A  KCNTRU EQU  $51
00053              0052  A  KCNTRL EQU  $52
00054              0053  A  JCNTRU EQU  $53
00055              0054  A  JCNTRL EQU  $54
00056              0055  A  RSINU  EQU  $55
00057              0056  A  RSINL  EQU  $56
00058              0057  A  RCOSU  EQU  $57
00059              0058  A  RCOSL  EQU  $58
00060              0059  A  AZREGU EQU  $59
00061              005A  A  AZREGL EQU  $5A
00062              00C1  A  LDMX   EQU  $C1
00063              00C4  A  LCPU   EQU  $C4
00064              00C5  A  LCPL   EQU  $C5
00065              00C6  A  RPRU   EQU  $C6
00066              00C7  A  RPRL   EQU  $C7
00067              00D0  A  RSAR   EQU  $D0
00068              00F0  A  LDMY   EQU  $F0
00069              00F4  A  STRIG  EQU  $F4
00070A 9000                       ORG  $9000       START OF PROG"B" PROM
00071A 9000        9022  A        FDB  SCAN0,SCAN1,SCAN2,SCAN3,SCAN4,SCAN5
00072A 9012        932C  A        FDB  SCAN9,SCANA,SCANB,SCANC,SCAND,SCANE
00073A 9022 96 21        A  SCAN0 LDAA AZIL
00074A 9024 D6 20        A        LDAB AZIU        GET CURRENT AZ
00075A 9026 9B 16        A        ADDA PSADL       ADD DELTA AZ
00076A 9028 D9 15        A        ADCB PSADU
00077A 902A C1 10        A        CMPB #$10
00078A 902C 2B 02 9030            BMI  SCAN0B      BRIF <360
00079A 902E 97 F4        A        STAA STRIG       ELSE SCOPE TRIG
00080A 9030 C4 0F        A  SCAN0B ANDB #$0F
00081A 9032 D7 20        A        STAB AZIU
00082A 9034 97 21        A        STAA AZIL        SAVE NEW AZ
```

```
00083A 9036 01          LINKUP  NOP
00084                   JMP SOSOS
00085A 9037 7E FFFF   A         JMP     $FFFF
00086A 903A 96 4C     A SCAN1   LDAA    CKWISE
00087A 903C 27 26 9064          BEQ     SCAN1B    BRIF CCW
00088A 903E 96 21     A         LDAA    AZIL
00089A 9040 D6 20     A         LDAB    AZIU
00090A 9042 9B 16     A         ADDA    PSADL     ADD DELTA AZ
00091A 9044 D9 15     A         ADCB    PSADU
00092A 9046 97 21     A         STAA    AZIL
00093A 9048 D7 20     A         STAB    AZIU      SAVE NEW AZ
00094A 904A 90 4E     A         SUBA    SIZ2L
00095A 904C D2 4D     A         SBCB    SIZ2U
00096A 904E 2B 11 9061          BMI     SCAN1C    BRIF IN SECTOR
00097A 9050 90 4E     A         SUBA    SIZ2L
00098A 9052 D2 4D     A         SBCB    SIZ2U     CALC NEW AZ
00099A 9054 43                  COMA
00100A 9055 53                  COMB
00101A 9056 8B 01     A         ADDA    #1
00102A 9058 C9 00     A         ADCB    #0
00103A 905A 97 21     A         STAA    AZIL
00104A 905C D7 20     A         STAB    AZIU      SAVE NEW AZ
00105A 905E 4F                  CLRA
00106A 905F 97 4C     A         STAA    CKWISE    MAKE DIR=CCW
00107A 9061 7E 9036   A SCAN1C  JMP     LINKUP    DONE WITH AZ CALC
00108A 9064 96 21     A SCAN1B  LDAA    AZIL
00109A 9066 D6 20     A         LDAB    AZIU
00110A 9068 90 16     A         SUBA    PSADL
00111A 906A D2 15     A         SBCB    PSADU     SUBTR. DELTA
00112A 906C 97 21     A         STAA    AZIL
00113A 906E D7 20     A         STAB    AZIU
00114A 9070 9B 4E     A         ADDA    SIZ2L
00115A 9072 D9 4D     A         ADCB    SIZ2U
00116A 9074 2A EB 9061          BPL     SCAN1C    BRIF IN SECTOR
00117A 9076 97 F4     A         STAA    STRIG     SCOPETRIG
00118A 9078 9B 4E     A         ADDA    SIZ2L     CALC NEW AZ
00119A 907A D9 4D     A         ADCB    SIZ2U
00120A 907C 43                  COMA
00121A 907D 53                  COMB
00122A 907E 8B 01     A         ADDA    #1
00123A 9080 C9 00     A         ADCB    #0
00124A 9082 97 21     A         STAA    AZIL
00125A 9084 D7 20     A         STAB    AZIU
00126A 9086 86 01     A         LDAA    #1
00127A 9088 97 4C     A         STAA    CKWISE    MAKE CW
00128A 908A 7E 9036   A         JMP     LINKUP    DONE
00129A 908D 96 28     A SCAN2   LDAA    PASS
00130A 908F 2A 08 9099          BPL     SCAN2A
00131A 9091 96 16     A         LDAA    PSADL
00132A 9093 D6 15     A         LDAB    PSADU
00133A 9095 97 0A     A         STAA    SSADL
00134A 9097 D7 09     A         STAB    SSADU
00135A 9099 96 4F     A SCAN2A  LDAA    UPDOWN
00136A 909B 27 26 90C3          BEQ     SCAN2B    BRIF DOWN
00137A 909D 96 23     A         LDAA    ELVIL
00138A 909F D6 22     A         LDAB    ELVIU
00139A 90A1 9B 0A     A         ADDA    SSADL
00140A 90A3 D9 09     A         ADCB    SSADU
00141A 90A5 97 23     A         STAA    ELVIL
00142A 90A7 D7 22     A         STAB    ELVIU     SAVE NEW ELV
00143A 90A9 90 4E     A         SUBA    SIZ2L
00144A 90AB D2 4D     A         SBCB    SIZ2U
00145A 90AD 2B 11 90C0          BMI     SCAN2C    BRIF WITHIN SECTOR
00146A 90AF 90 4E     A         SUBA    SIZ2L
00147A 90B1 D2 4D     A         SBCB    SIZ2U
```

```
00148A 90B3 43                        COMA
00149A 90B4 53                        COMB
00150A 90B5 8B 01      A              ADDA    #1
00151A 90B7 C9 00      A              ADCB    #0
00152A 90B9 97 23      A              STAA    ELVIL
00153A 90BB D7 22      A              STAB    ELVIU    SAVE ELV
00154A 90BD 4F                        CLRA
00155A 90BE 97 4F      A              STAA    UPDOWN   SET MOTION TO DOWN
00156A 90C0 7E 9036    A  SCAN2C      JMP     LINKUP   DONE
00157A 90C3 96 23      A  SCAN2B      LDAA    ELVIL
00158A 90C5 D6 22      A              LDAB    ELVIU
00159A 90C7 90 0A      A              SUBA    SSADL
00160A 90C9 D2 09      A              SBCB    SSADU
00161A 90CB 97 23      A              STAA    ELVIL
00162A 90CD D7 22      A              STAB    ELVIU    SAVE NEW ELV
00163A 90CF 9B 4E      A              ADDA    SIZ2L
00164A 90D1 D9 4D      A              ADCB    SIZ2U
00165A 90D3 2A EB 90C0                BPL     SCAN2C   BRIF WITHIN SECTOR
00166A 90D5 97 F4      A              STAA    STRIG    SCOPE TRIG AT SECTOR BOUND
00167A 90D7 9B 4E      A              ADDA    SIZ2L
00168A 90D9 D9 4D      A              ADCB    SIZ2U
00169A 90DB 43                        COMA
00170A 90DC 53                        COMB
00171A 90DD 8B 01      A              ADDA    #1
00172A 90DF C9 00      A              ADCB    #0
00173A 90E1 97 23      A              STAA    ELVIL
00174A 90E3 D7 22      A              STAB    ELVIU
00175A 90E5 86 02      A              LDAA    #2
00176A 90E7 97 4F      A              STAA    UPDOWN   SET MOTION TO UP
00177A 90E9 7E 9036    A              JMP     LINKUP   DONE
00178A 90EC 96 4C      A  SCAN3       LDAA    CKWISE
00179A 90EE 27 1F 910F                BEQ     SCAN3B   BRIF CCW
00180A 90F0 96 21      A              LDAA    AZIL
00181A 90F2 D6 20      A              LDAB    AZIU
00182A 90F4 9B 16      A              ADDA    PSADL
00183A 90F6 D9 15      A              ADCB    PSADU
00184A 90F8 97 21      A              STAA    AZIL
00185A 90FA D7 20      A              STAB    AZIU
00186A 90FC 90 4E      A              SUBA    SIZ2L
00187A 90FE D2 4D      A              SBCB    SIZ2U
00188A 9100 2B 0A 910C                BMI     SCAN3C   BRIF WITHIN SECTOR
00189A 9102 97 F4      A              STAA    STRIG    SCOPE TRIG AT FLYBACK
00190A 9104 90 4E      A              SUBA    SIZ2L
00191A 9106 D2 4D      A              SBCB    SIZ2U
00192A 9108 97 21      A              STAA    AZIL
00193A 910A D7 20      A              STAB    AZIU
00194A 910C 7E 9036    A  SCAN3C      JMP     LINKUP   DONE
00195A 910F 96 21      A  SCAN3B      LDAA    AZIL     CCW PROCESSING
00196A 9111 D6 20      A              LDAB    AZIU
00197A 9113 90 16      A              SUBA    PSADL
00198A 9115 D2 15      A              SBCB    PSADU
00199A 9117 97 21      A              STAA    AZIL
00200A 9119 D7 20      A              STAB    AZIU     SAVE AZ
00201A 911B 9B 4E      A              ADDA    SIZ2L
00202A 911D D9 4D      A              ADCB    SIZ2U
00203A 911F 2A EB 910C                BPL     SCAN3C   BRIF WITHIN SECTOR
00204A 9121 97 F4      A              STAA    STRIG    ELSE TRIG AT FLYBACK
00205A 9123 9B 4E      A              ADDA    SIZ2L
00206A 9125 D9 4D      A              ADCB    SIZ2U
00207A 9127 97 21      A              STAA    AZIL
00208A 9129 D7 20      A              STAB    AZIU
00209A 912B 7E 9036    A              JMP     LINKUP   DONE
00210A 912E 96 28      A  SCAN4       LDAA    PASS
00211A 9130 2A 08 913A                BPL     SCAN4A   BRIF NOT FIRST PASS
00212A 9132 96 16      A              LDAA    PSADL
```

```
00213A 9134 D6 15    A          LDAB  PSADU
00214A 9136 97 0A    A          STAA  SSADL
00215A 9138 D7 09    A          STAB  SSADU
00216A 913A 96 4F    A  SCAN4A  LDAA  UPDOWN
00217A 913C 27 1F 915D          BEQ   SCAN4B   BRIF DOWN
00218A 913E 96 23    A          LDAA  ELVIL
00219A 9140 D6 22    A          LDAB  ELVIU
00220A 9142 9B 0A    A          ADDA  SSADL    ADD DELTA ELV
00221A 9144 D9 09    A          ADCB  SSADU
00222A 9146 97 23    A          STAA  ELVIL
00223A 9148 D7 22    A          STAB  ELVIU
00224A 914A 90 4E    A          SUBA  SIZ2L
00225A 914C D2 4D    A          SBCB  SIZ2U
00226A 914E 2B 0A 915A          BMI   SCAN4C   BRIF WITHIN SECTOR
00227A 9150 97 F4    A          STAA  STRIG    ELSE SCOPE TRIG AT FLYBACK
00228A 9152 90 4E    A          SUBA  SIZ2L
00229A 9154 D2 4D    A          SBCB  SIZ2U    CALC NEW EL
00230A 9156 97 23    A          STAA  ELVIL
00231A 9158 D7 22    A          STAB  ELVIU
00232A 915A 7E 9036  A  SCAN4C  JMP   LINKUP   DONE
00233A 915D 96 23    A  SCAN4B  LDAA  ELVIL
00234A 915F D6 22    A          LDAB  ELVIU
00235A 9161 90 0A    A          SUBA  SSADL    SUBTR DELTA ELV
00236A 9163 D2 09    A          SBCB  SSADU
00237A 9165 97 23    A          STAA  ELVIL
00238A 9167 D7 22    A          STAB  ELVIU
00239A 9169 9B 4E    A          ADDA  SIZ2L
00240A 916B D9 4D    A          ADCB  SIZ2U
00241A 916D 2A EB 915A          BPL   SCAN4C   BRIF WITHINSECTOR
00242A 916F 97 F4    A          STAA  STRIG    SCOPE TRIG AT FLYBACK
00243A 9171 9B 4E    A          ADDA  SIZ2L
00244A 9173 D9 4D    A          ADCB  SIZ2U
00245A 9175 97 23    A          STAA  ELVIL
00246A 9177 D7 22    A          STAB  ELVIU
00247A 9179 7E 9036  A          JMP   LINKUP   DONE
00248A 917C 96 4C    A  SCAN5   LDAA  CKWISE
00249A 917E 27 2C 91AC          BEQ   SCAN5B   BRIF CCW
00250A 9180 96 21    A          LDAA  AZIL
00251A 9182 D6 20    A          LDAB  AZIU
00252A 9184 9B 16    A          ADDA  PSADL
00253A 9186 D9 15    A          ADCB  PSADU    ADD DELTA AZ
00254A 9188 97 21    A          STAA  AZIL
00255A 918A D7 20    A          STAB  AZIU
00256A 918C 90 4E    A          SUBA  SIZ2L
00257A 918E D2 4D    A          SBCB  SIZ2U
00258A 9190 2B 17 91A9          BMI   SCAN5C   BRIF WITHIN SECTOR
00259A 9192 90 12    A          SUBA  DZAL     TEST:WITHIN DEADZONE?
00260A 9194 D2 11    A          SBCB  DZAU
00261A 9196 2A 07 919F          BPL   SCAN5D   BRIF OUT OF DEAD ZONE
00262A 9198 86 7E    A  SCAN5E  LDAA  #$7E
00263A 919A 97 29    A          STAA  ATTNEW   MAX ATTEN TO OUTPUT
00264                        *JMP  TIM9******
00265A 919C 7E FFFF  A  DEADZN  JMP   $FFFF    SKIP SOSOS PROCESS
00266A 919F 97 F4    A  SCAN5D  STAA  STRIG    SCOPE TRIG AT EXIT OF DZ
00267A 91A1 90 4E    A          SUBA  SIZ2L    CALC NEW AZ
00268A 91A3 D2 4D    A          SBCB  SIZ2U
00269A 91A5 97 21    A          STAA  AZIL
00270A 91A7 D7 20    A          STAB  AZIU
00271A 91A9 7E 9036  A  SCAN5C  JMP   LINKUP   DONE
00272A 91AC 96 21    A  SCAN5B  LDAA  AZIL     CCW PROCESSING
00273A 91AE D6 20    A          LDAB  AZIU
00274A 91B0 90 16    A          SUBA  PSADL
00275A 91B2 D2 15    A          SBCB  PSADU    SUBTR DELTA AZ
00276A 91B4 97 21    A          STAA  AZIL
00277A 91B6 D7 20    A          STAB  AZIU
```

```
00343A 9240 27 08 924A              BEQ     SCAN8Z    BRIF NO SCALE NECC
00344A 9242 54            SCAN8C    LSRB              CONIC ANG SCALING
00345A 9243 46                      RORA
00346A 9244 7C 004B A               INC     CONRES
00347A 9247 5D                      TSTB
00348A 9248 26 F8 9242              BNE     SCAN8C    DO UNTIL CON ANG<=8BITS
00349A 924A 97 4A    A   SCAN8Z     STAA    CONE      SAVE SCALED CONIC ANGLE
00350A 924C 96 3D    A   SCAN8A     LDAA    BETAIL    GET OLD BETA
00351A 924E D6 3C    A              LDAB    BETAIU
00352A 9250 9B 16    A              ADDA    PSADL     ADD DELTA
00353A 9252 D9 15    A              ADCB    PSADU
00354A 9254 C1 10    A              CMPB    #$10
00355A 9256 2B 02 925A              BMI     SCAN8B    BRIF <360
00356A 9258 97 F4    A              STAA    STRIG     SCOPE TRIG @360 DEG
00357A 925A BD 9268  A   SCAN8B     JSR     CONICL
00358A 925D DE 57    A              LDX     RCOSU     R*COS(BETA)
00359A 925F DF 20    A              STX     AZIU      NEW AZ
00360A 9261 DE 55    A              LDX     RSINU
00361A 9263 DF 22    A              STX     ELVIU     NEW ELV
00362A 9265 7E 9036  A              JMP     LINKUP    DONE
00363                               **SR FOR CONIC TYPE SCANS
00364A 9268 C4 0F    A   CONICL     ANDB    #$0F      MASK >360
00365A 926A D7 3C    A              STAB    BETAIU
00366A 926C 97 3D    A              STAA    BETAIL    SAVE NEW BETA
00367A 926E 54                      LSRB
00368A 926F 46                      RORA
00369A 9270 54                      LSRB              SCALE DOWN FOR SINE/COS LO
00370A 9271 46                      RORA
00371A 9272 97 02    A              STAA    SCR2      SAVE LOOKUP ADDR
00372A 9274 C1 03    A              CMPB    #3        BETA>=270?
00373A 9276 2A 61 92D9              BPL     SCAN8G
00374A 9278 C1 02    A              CMPB    #2        BETA>=180
00375A 927A 2A 39 92B5              BPL     SCAN8F
00376A 927C C1 01    A              CMPB    #1        BETA >=90?
00377A 927E 2A 17 9297              BPL     SCAN8D
00378A 9280 BD 92F7  A              JSR     SCAN8E    BETA IS<90,DO RCOS(B)
00379A 9283 97 58    A              STAA    RCOSL
00380A 9285 D7 57    A              STAB    RCOSU     SAVE NEW AZ
00381A 9287 5F                      CLRB
00382A 9288 96 02    A              LDAA    SCR2      GET BETA(SCALED)
00383A 928A 43                      COMA              COS(90-B)=SIN(B)
00384A 928B 8B 01    A              ADDA    #1
00385A 928D C9 00    A              ADCB    #0
00386A 928F BD 92F7  A              JSR     SCAN8E
00387A 9292 97 56    A              STAA    RSINL
00388A 9294 D7 55    A              STAB    RSINU     SAVE NEW EL
00389A 9296 39                      RTS               DONE WITH CONICL
00390A 9297 5F            SCAN8D    CLRB
00391A 9298 BD 92F7  A              JSR     SCAN8E
00392A 929B 97 56    A              STAA    RSINL
00393A 929D D7 55    A              STAB    RSINU     SAVE NEW EL VALUES
00394A 929F 5F                      CLRB
00395A 92A0 96 02    A              LDAA    SCR2      GET BETA(SCALED)
00396A 92A2 43                      COMA              DO 2'S COMPL
00397A 92A3 8B 01    A              ADDA    #1
00398A 92A5 C9 00    A              ADCB    #0
00399A 92A7 BD 92F7  A              JSR     SCAN8E
00400A 92AA 43                      COMA              MAKE RESULT NEG
00401A 92AB 53                      COMB
00402A 92AC 8B 01    A              ADDA    #1
00403A 92AE C9 00    A              ADCB    #0
00404A 92B0 97 58    A              STAA    RCOSL     SAVE NEW AZ
00405A 92B2 D7 57    A              STAB    RCOSU
00406A 92B4 39                      RTS               DONE WITH CONICL SR
```

```
00278A 91B8 9B 4E      A            ADDA   SIZ2L
00279A 91BA D9 4D      A            ADCB   SIZ2U
00280A 91BC 2A EB 91A9              BPL    SCAN5C   BRIF WITHIN SECTOR
00281A 91BE 9B 12      A            ADDA   DZAL
00282A 91C0 D9 11      A            ADCB   DZAU
00283A 91C2 2A D4 9198              BPL    SCAN5E   BRIF IN DEADZONE
00284A 91C4 97 F4      A            STAA   STRIG    SCOPE TRIG AT EXIT OF DZ
00285A 91C6 9B 4E      A            ADDA   SIZ2L
00286A 91C8 D9 4D      A            ADCB   SIZ2U
00287A 91CA 97 21      A            STAA   AZIL
00288A 91CC D7 20      A            STAB   AZIU
00289A 91CE 7E 9036    A            JMP    LINKUP   DONE
00290A 91D1 96 4F      A  SCAN6     LDAA   UPDOWN
00291A 91D3 27 2C 9201              BEQ    SCAN6B   BRIF DOWN
00292A 91D5 96 23      A            LDAA   ELVIL
00293A 91D7 D6 22      A            LDAB   ELVIU
00294A 91D9 9B 16      A            ADDA   PSADL
00295A 91DB D9 15      A            ADCB   PSADU
00296A 91DD 97 23      A            STAA   ELVIL
00297A 91DF D7 22      A            STAB   ELVIU
00298A 91E1 90 4E      A            SUBA   SIZ2L
00299A 91E3 D2 4D      A            SBCB   SIZ2U
00300A 91E5 2B 17 91FE              BMI    SCAN6C
00301A 91E7 90 12      A            SUBA   DZAL     TEST; IN DEADZONE?
00302A 91E9 D2 11      A            SBCB   DZAU
00303A 91EB 2A 07 91F4              BPL    SCAN6D
00304A 91ED 86 7E      A  SCAN6E    LDAA   #$7E
00305A 91EF 97 29      A            STAA   ATTNEW   MAX ATTEN
00306A 91F1 7E 919C    A            JMP    DEADZN
00307A 91F4 97 F4      A  SCAN6D    STAA   STRIG    SCOPE TRIG AT EXIT OF DZ
00308A 91F6 90 4E      A            SUBA   SIZ2L
00309A 91F8 D2 4D      A            SBCB   SIZ2U
00310A 91FA 97 23      A            STAA   ELVIL
00311A 91FC D7 22      A            STAB   ELVIU
00312A 91FE 7E 9036    A  SCAN6C    JMP    LINKUP   DONE
00313A 9201 96 23      A  SCAN6B    LDAA   ELVIL    DOWN PROCESSING
00314A 9203 D6 22      A            LDAB   ELVIU
00315A 9205 90 16      A            SUBA   PSADL
00316A 9207 D2 15      A            SBCB   PSADU    SUBTR DELTA ELV
00317A 9209 97 23      A            STAA   ELVIL
00318A 920B D7 22      A            STAB   ELVIU
00319A 920D 9B 4E      A            ADDA   SIZ2L
00320A 920F D9 4D      A            ADCB   SIZ2U
00321A 9211 2A EB 91FE              BPL    SCAN6C   BRIF WITHIN SECTOR
00322A 9213 9B 12      A            ADDA   DZAL
00323A 9215 D9 11      A            ADCB   DZAU     TEST:IN DEADZONE?
00324A 9217 2A D4 91ED              BPL    SCAN6E
00325A 9219 97 F4      A            STAA   STRIG    SCOPE TRIG EXIT DEADZN
00326A 921B 9B 4E      A            ADDA   SIZ2L
00327A 921D D9 4D      A            ADCB   SIZ2U
00328A 921F 97 23      A            STAA   ELVIL
00329A 9221 D7 22      A            STAB   ELVIU
00330A 9223 7E 9036    A            JMP    LINKUP
00331A 9226 CE 0000    A  SCAN7     LDX    #0       STEADY SCAN
00332A 9229 DF 20      A            STX    AZIU
00333A 922B DF 22      A            STX    ELVIU
00334A 922D 7E 9036    A            JMP    LINKUP   DONE
00335A 9230 96 28      A  SCAN8     LDAA   PASS
00336A 9232 2A 18 924C              BPL    SCAN8A   BRIF NOT FIRST PASS
00337A 9234 CE 0000    A            LDX    #0
00338A 9237 DF 3C      A            STX    BETAIU   INITIAL BETA=0
00339A 9239 4F                      CLRA
00340A 923A 97 4B      A            STAA   CONRES
00341A 923C 96 12      A            LDAA   DZAL
00342A 923E D6 11      A            LDAB   DZAU     CONIC ANGLE
```

```
00407A 92B5 5F              SCAN8F  CLRB
00408A 92B6 BD 92F7    A            JSR     SCAN8E      BETA >=180,<270
00409A 92B9 43                      COMA                MAKE AZ NEG
00410A 92BA 53                      COMB
00411A 92BB 8B 01      A            ADDA    #1
00412A 92BD C9 00      A            ADCB    #0
00413A 92BF 97 58      A            STAA    RCOSL
00414A 92C1 D7 57      A            STAB    RCOSU
00415A 92C3 5F                      CLRB
00416A 92C4 96 02      A            LDAA    SCR2
00417A 92C6 43                      COMA                COS (90-B)=SIN (B)
00418A 92C7 8B 01      A            ADDA    #1
00419A 92C9 C9 00      A            ADCB    #0
00420A 92CB BD 92F7    A            JSR     SCAN8E
00421A 92CE 43                      COMA                MAKE EL NEG
00422A 92CF 53                      COMB
00423A 92D0 8B 01      A            ADDA    #1
00424A 92D2 C9 00      A            ADCB    #0
00425A 92D4 97 56      A            STAA    RSINL
00426A 92D6 D7 55      A            STAB    RSINU
00427A 92D8 39                      RTS                 DONE WITH CONICL SR
00428A 92D9 5F              SCAN8G  CLRB
00429A 92DA BD 92F7    A            JSR     SCAN8E
00430A 92DD 43                      COMA                MAKE EL NEG
00431A 92DE 53                      COMB
00432A 92DF 8B 01      A            ADDA    #1
00433A 92E1 C9 00      A            ADCB    #0
00434A 92E3 97 56      A            STAA    RSINL
00435A 92E5 D7 55      A            STAB    RSINU       SAVE NEW EL
00436A 92E7 5F                      CLRB
00437A 92E8 96 02      A            LDAA    SCR2
00438A 92EA 43                      COMA
00439A 92EB 8B 01      A            ADDA    #1
00440A 92ED C9 00      A            ADCB    #0
00441A 92EF BD 92F7    A            JSR     SCAN8E
00442A 92F2 97 58      A            STAA    RCOSL
00443A 92F4 D7 57      A            STAB    RCOSU       SAVE NEW AZ
00444A 92F6 39                      RTS                 DONE WITH CONICL SR
00445A 92F7 CE 8E00    A  SCAN8E    LDX     #$8E00      START OF COSINE TABLE
00446A 92FA DF 00      A            STX     SCR0
00447A 92FC 9B 01      A            ADDA    SCR1        ADD LOOKUP OFFSET
00448A 92FE D9 00      A            ADCB    SCR0
00449A 9300 97 01      A            STAA    SCR1
00450A 9302 D7 00      A            STAB    SCR0
00451A 9304 DE 00      A            LDX     SCR0
00452A 9306 E6 00      A            LDAB    0,X         GET COSINE*128
00453A 9308 D7 F0      A            STAB    LDMY
00454A 930A 96 4A      A            LDAA    CONE        SCALED CONIC ANGLE
00455A 930C 97 C1      A            STAA    LDMX        DO MPY
00456A 930E DE C6      A            LDX     RPRU        GET RESULT
00457A 9310 C6 80      A            LDAB    #128
00458A 9312 D7 F0      A            STAB    LDMY
00459A 9314 DF C4      A            STX     LCPU        ADJUST RESULT;/128
00460A 9316 96 4B      A            LDAA    CONRES
00461A 9318 97 1B      A            STAA    SCR1B
00462A 931A 5F                      CLRB
00463A 931B 96 D0      A            LDAA    RSAR        GET RESULT
00464A 931D 7D 001B    A            TST     SCR1B       TEST RESIDUE
00465A 9320 27 09 932B           BEQ     SCAN8Q      BRIF NO ADJ NECC
00466A 9322 48                      ASLA
00467A 9323 59                      ROLB
00468A 9324 7A 001B    A            DEC     SCR1B
00469A 9327 27 02 932B           BEQ     SCAN8Q
00470A 9329 48                      ASLA
00471A 932A 59                      ROLB
```

```
00472A 932B 39            SCAN8Q RTS
00473A 932C 96 28      A  SCAN9  LDAA  PASS
00474A 932E 2A 0A 933A        BPL   SCAN9A    BRIF NOT FIRST PASS
00475A 9330 74 0005    A      LSR   SECSSU    DIVIDE SECTOR(EL) BY 2
00476A 9333 76 0006    A      ROR   SECSSL
00477A 9336 DE 05      A      LDX   SECSSU
00478A 9338 DF 22      A      STX   ELVIU     INIT EL
00479A 933A 96 4C      A SCAN9A LDAA CKWISE
00480A 933C 26 03 9341        BNE   SCAN9Z    BRIF CW
00481A 933E 7E 93C8    A      JMP   SCAN9B
00482A 9341 96 21      A SCAN9Z LDAA AZIL
00483A 9343 D6 20      A      LDAB  AZIU
00484A 9345 9B 16      A      ADDA  PSADL
00485A 9347 D9 15      A      ADCB  PSADU
00486A 9349 97 21      A      STAA  AZIL
00487A 934B D7 20      A      STAB  AZIU      SAVE NEW AZ
00488A 934D 90 4E      A      SUBA  SIZ2L
00489A 934F D2 4D      A      SBCB  SIZ2U
00490A 9351 2B 11 9364        BMI   SCAN9C    BRIF WITHIN SECTOR
00491A 9353 90 4E      A      SUBA  SIZ2L
00492A 9355 D2 4D      A      SBCB  SIZ2U     CALC NEW AZ
00493A 9357 43                COMA
00494A 9358 53                COMB
00495A 9359 8B 01      A      ADDA  #1
00496A 935B C9 00      A      ADCB  #0
00497A 935D 7F 004C    A      CLR   CKWISE    MAKE CCW
00498A 9360 97 F4      A      STAA  STRIG     SCOPE TRIG
00499A 9362 20 03 9367        BRA   SCAN9F
00500A 9364 7E 9036    A SCAN9C JMP  LINKUP    DONE; GET BACK TO SOSOS
00501A 9367 97 21      A SCAN9F STAA AZIL
00502A 9369 D7 20      A      STAB  AZIU      SAVE AZ
00503A 936B 96 4F      A      LDAA  UPDOWN
00504A 936D 27 22 9391        BEQ   SCAN9D    BRIF DOWN
00505A 936F 96 23      A      LDAA  ELVIL
00506A 9371 D6 22      A      LDAB  ELVIU
00507A 9373 9B 0A      A      ADDA  SSADL
00508A 9375 D9 09      A      ADCB  SSADU
00509A 9377 97 23      A      STAA  ELVIL     SAVE NEW EL
00510A 9379 D7 22      A      STAB  ELVIU
00511A 937B 90 06      A      SUBA  SECSSL    TEST:OUTSIDE EL SECTOR?
00512A 937D D2 05      A      SBCB  SECSSU
00513A 937F 2B E3 9364        BMI   SCAN9C    BRIF WITHIN EL SECTOR
00514A 9381 96 06      A      LDAA  SECSSL
00515A 9383 D6 05      A      LDAB  SECSSU
00516A 9385 43                COMA
00517A 9386 53                COMB
00518A 9387 8B 01      A      ADDA  #1
00519A 9389 C9 00      A      ADCB  #0
00520A 938B 97 23      A      STAA  ELVIL     RESET EL TO -SS/2
00521A 938D D7 22      A      STAB  ELVIU
00522A 938F 20 1D 93AE        BRA   SCAN9E
00523A 9391 96 23      A SCAN9D LDAA ELVIL     DOWN PROCESSING
00524A 9393 D6 22      A      LDAB  ELVIU
00525A 9395 90 0A      A      SUBA  SSADL
00526A 9397 D2 09      A      SBCB  SSADU     SUBTR. DELTA EL
00527A 9399 97 23      A      STAA  ELVIL
00528A 939B D7 22      A      STAB  ELVIU     SAVE NEW EL
00529A 939D 9B 06      A      ADDA  SECSSL
00530A 939F D9 05      A      ADCB  SECSSU    TEST IN EL SECTOR?
00531A 93A1 27 04 93A7        BEQ   SCAN9Y
00532A 93A3 2A BF 9364        BPL   SCAN9C    BRIF IN SECTOR
00533A 93A5 20 03 93AA        BRA   SCAN9X
00534A 93A7 4D           SCAN9Y TSTA
00535A 93A8 26 BA 9364        BNE   SCAN9C
00536A 93AA DE 05      A SCAN9X LDX  SECSSU
```

```
00537A 93AC DF 22      A            STX    ELVIU
00538A 93AE 96 0B      A  SCAN9E    LDAA   SCAD      GET INITIAL DIR.
00539A 93B0 84 01      A            ANDA   #1        MASK CW/CCW BIT
00540A 93B2 91 4C      A            CMPA   CKWISE    INITIAL=PRESENT/
00541A 93B4 27 AE 9364            BEQ    SCAN9C    BRIF OK
00542A 93B6 97 4C      A            STAA   CKWISE    ELSE MAKE SAME
00543A 93B8 96 21      A            LDAA   AZIL
00544A 93BA D6 20      A            LDAB   AZIU
00545A 93BC 43                      COMA             ADJUST AZ
00546A 93BD 53                      COMB
00547A 93BE 8B 01      A            ADDA   #1
00548A 93C0 C9 00      A            ADCB   #0
00549A 93C2 97 21      A            STAA   AZIL
00550A 93C4 D7 20      A            STAB   AZIU
00551A 93C6 20 9C 9364            BRA    SCAN9C
00552A 93C8 96 21      A  SCAN9B    LDAA   AZIL      CCW PROCESSING
00553A 93CA D6 20      A            LDAB   AZIU
00554A 93CC 90 16      A            SUBA   PSADL
00555A 93CE D2 15      A            SBCB   PSADU
00556A 93D0 97 21      A            STAA   AZIL
00557A 93D2 D7 20      A            STAB   AZIU      SAVE AZ
00558A 93D4 9B 4E      A            ADDA   SIZ2L
00559A 93D6 D9 4D      A            ADCB   SIZ2U
00560A 93D8 2A 8A 9364            BPL    SCAN9C    BRIF WITHIN SECTOR
00561A 93DA 9B 4E      A            ADDA   SIZ2L
00562A 93DC D9 4D      A            ADCB   SIZ2U     CALC NEW AZ
00563A 93DE 43                      COMA
00564A 93DF 53                      COMB
00565A 93E0 8B 01      A            ADDA   #1
00566A 93E2 C9 00      A            ADCB   #0
00567A 93E4 7C 004C    A            INC    CKWISE    MAKE CW
00568A 93E7 7E 9367    A            JMP    SCAN9F    DO EL UPDATE
00569A 93EA 96 28      A  SCANA     LDAA   PASS
00570A 93EC 2A 0A 93F8            BPL    SCANAA    BRIF NOT FIRST PASS
00571A 93EE 74 0005    A            LSR    SECSSU
00572A 93F1 76 0006    A            ROR    SECSSL    DIVIDE SECTOR/2
00573A 93F4 DE 05      A            LDX    SECSSU
00574A 93F6 DF 22      A            STX    ELVIU     INIT ELV
00575A 93F8 96 4C      A  SCANAA    LDAA   CKWISE
00576A 93FA 27 2B 9427            BEQ    SCANAB    BRIF CCW
00577A 93FC 96 21      A            LDAA   AZIL
00578A 93FE D6 20      A            LDAB   AZIU
00579A 9400 9B 16      A            ADDA   PSADL
00580A 9402 D9 15      A            ADCB   PSADU     ADD DELTA AZ
00581A 9404 97 21      A            STAA   AZIL
00582A 9406 D7 20      A            STAB   AZIU
00583A 9408 90 4E      A            SUBA   SIZ2L
00584A 940A D2 4D      A            SBCB   SIZ2U
00585A 940C 2B 0D 941B            BMI    SCANAC    BRIF WITHIN SECTOR
00586A 940E 90 12      A            SUBA   DZAL
00587A 9410 D2 11      A            SBCB   DZAU      TEST:WITHIN DZ?
00588A 9412 2A 0A 941E            BPL    SCANAD
00589A 9414 86 7E      A  SCANAE    LDAA   #$7E
00590A 9416 97 29      A            STAA   ATTNEW    MAX ATTEN
00591A 9418 7E 919C    A            JMP    DEADZN    SKIP SOSOS PROCESS
00592A 941B 7E 9036    A  SCANAC    JMP    LINKUP
00593A 941E 90 4E      A  SCANAD    SUBA   SIZ2L
00594A 9420 D2 4D      A            SBCB   SIZ2U
00595A 9422 97 F4      A            STAA   STRIG
00596A 9424 7E 9367    A            JMP    SCAN9F    DO EL PROCESSING(SCAN9)
00597A 9427 96 21      A  SCANAB    LDAA   AZIL      CCW PROCESSING
00598A 9429 D6 20      A            LDAB   AZIU
00599A 942B 90 16      A            SUBA   PSADL
00600A 942D D2 15      A            SBCB   PSADU
00601A 942F 97 21      A            STAA   AZIL
```

```
00602A 9431 D7 20    A           STAB  AZIU
00603A 9433 9B 4E    A           ADDA  SIZ2L
00604A 9435 D9 4D    A           ADCB  SIZ2U
00605A 9437 2A E2 941B           BPL   SCANAC    BRIF WITHIN SECTOR
00606A 9439 9B 12    A           ADDA  DZAL
00607A 943B D9 11    A           ADCB  DZAU      TEST:WITHIN DEADZN?
00608A 943D 2A D5 9414           BPL   SCANAE    BRIF WITHIN DEADZN
00609A 943F 9B 4E    A           ADDA  SIZ2L     ADJUST AZ
00610A 9441 D9 4D    A           ADCB  SIZ2U
00611A 9443 97 F4    A           STAA  STRIG
00612A 9445 7E 9367  A           JMP   SCAN9F
00613A 9448 96 28    A  SCANB    LDAA  PASS
00614A 944A 2A 2C 9478           BPL   SCANBA    BRIF NOT FIRST PASS
00615A 944C CE 0000  A           LDX   #0
00616A 944F DF 53    A           STX   JCNTRU
00617A 9451 DF 51    A           STX   KCNTRU    INITIALIZE
00618A 9453 DF 3C    A           STX   BETAIU
00619A 9455 DF 59    A           STX   AZREGU
00620A 9457 DF 55    A           STX   RSINU
00621A 9459 DF 57    A           STX   RCOSU
00622A 945B 96 06    A           LDAA  SECSSL
00623A 945D D6 05    A           LDAB  SECSSU
00624A 945F 54                   LSRB
00625A 9460 46                   RORA
00626A 9461 97 4E    A           STAA  SIZ2L
00627A 9463 D7 4D    A           STAB  SIZ2U
00628A 9465 4F                   CLRA
00629A 9466 97 4B    A           STAA  CONRES
00630A 9468 96 12    A           LDAA  DZAL
00631A 946A D6 11    A           LDAB  DZAU
00632A 946C 27 08 9476           BEQ   SCANBB
00633A 946E 54          SCANBC   LSRB              CONIC ANG SCALING
00634A 946F 46                   RORA
00635A 9470 7C 004B  A           INC   CONRES
00636A 9473 5D                   TSTB
00637A 9474 26 F8 946E           BNE   SCANBC    DO UNTIL<=8BITS
00638A 9476 97 4A    A  SCANBB   STAA  CONE
00639A 9478 DE 51    A  SCANBA   LDX   KCNTRU
00640A 947A 08                   INX               INCREMENT K
00641A 947B DF 51    A           STX   KCNTRU    SAVE
00642A 947D 9C 03    A           CPX   STMKU     K=KMAX?
00643A 947F 26 55 94D6           BNE   SCANBD
00644A 9481 CE 0000  A           LDX   #0
00645A 9484 DF 51    A           STX   KCNTRU
00646A 9486 96 4C    A           LDAA  CKWISE
00647A 9488 27 26 94B0           BEQ   SCANBE    BRIF CCW
00648A 948A 96 5A    A           LDAA  AZREGL
00649A 948C D6 59    A           LDAB  AZREGU
00650A 948E 9B 0A    A           ADDA  SSADL     ADD DELTATAZ
00651A 9490 D9 09    A           ADCB  SSADU
00652A 9492 97 5A    A           STAA  AZREGL
00653A 9494 D7 59    A           STAB  AZREGU
00654A 9496 90 4E    A           SUBA  SIZ2L
00655A 9498 D2 4D    A           SBCB  SIZ2U
00656A 949A 2B 3A 94D6           BMI   SCANBD    BRIF WITHIN SECTOR
00657A 949C 90 4E    A           SUBA  SIZ2L
00658A 949E D2 4D    A           SBCB  SIZ2U     CALC NEW AZ
00659A 94A0 43                   COMA
00660A 94A1 53                   COMB
00661A 94A2 8B 01    A           ADDA  #1
00662A 94A4 C9 00    A           ADCB  #0
00663A 94A6 97 5A    A           STAA  AZREGL
00664A 94A8 D7 59    A           STAB  AZREGU
00665A 94AA 4F                   CLRA
00666A 94AB 97 4C    A           STAA  CKWISE
```

```
00667A 94AD 7E 94D6   A           JMP    SCANBD
00668A 94B0 96 5A     A  SCANBE   LDAA   AZREGL
00669A 94B2 D6 59     A           LDAB   AZREGU
00670A 94B4 90 0A     A           SUBA   SSADL
00671A 94B6 D2 09     A           SBCB   SSADU
00672A 94B8 97 5A     A           STAA   AZREGL
00673A 94BA D7 59     A           STAB   AZREGU
00674A 94BC 9B 4E     A           ADDA   SIZ2L
00675A 94BE D9 4D     A           ADCB   SIZ2U
00676A 94C0 2A 14 94D6            BPL    SCANBD   BRIF WITHIN SECTOR
00677A 94C2 97 F4     A           STAA   STRIG
00678A 94C4 9B 4E     A           ADDA   SIZ2L
00679A 94C6 D9 4D     A           ADCB   SIZ2U
00680A 94C8 43                    COMA
00681A 94C9 53                    COMB
00682A 94CA 8B 01     A           ADDA   #1
00683A 94CC C9 00     A           ADCB   #0
00684A 94CE 97 5A     A           STAA   AZREGL
00685A 94D0 D7 59     A           STAB   AZREGU
00686A 94D2 86 01     A           LDAA   #1
00687A 94D4 97 4C     A           STAA   CKWISE
00688A 94D6 DE 53     A  SCANBD   LDX    JCNTRU
00689A 94D8 08                    INX
00690A 94D9 DF 53     A           STX    JCNTRU
00691A 94DB 9C 07     A           CPX    PTMJU    J=JMAX?
00692A 94DD 26 10 94EF            BNE    SCANBF
00693A 94DF CE 0000   A           LDX    #0
00694A 94E2 DF 53     A           STX    JCNTRU
00695A 94E4 96 3D     A           LDAA   BETAIL
00696A 94E6 D6 3C     A           LDAB   BETAIU
00697A 94E8 9B 16     A           ADDA   PSADL
00698A 94EA D9 15     A           ADCB   PSADU
00699A 94EC BD 9268   A           JSR    CONICL
00700A 94EF 7E 95F4   A  SCANBF   JMP    SCANGF
00701A 94F2 96 28     A  SCANC    LDAA   PASS
00702A 94F4 2A 07 94FD            BPL    SCANCA
00703A 94F6 CE 0000   A           LDX    #0
00704A 94F9 DF 3C     A           STX    BETAIU
00705A 94FB DF 11     A           STX    DZAU     INIT
00706A 94FD 96 12     A  SCANCA   LDAA   DZAL
00707A 94FF D6 11     A           LDAB   DZAU
00708A 9501 9B 0A     A           ADDA   SSADL
00709A 9503 D9 09     A           ADCB   SSADU
00710A 9505 97 12     A           STAA   DZAL
00711A 9507 D7 11     A           STAB   DZAU
00712A 9509 90 06     A           SUBA   SECSSL
00713A 950B D2 05     A           SBCB   SECSSU   R>=RMAX?
00714A 950D 2B 09 9518            BMI    SCANCB   BRIF <RMAX
00715A 950F CE 0000   A           LDX    #0
00716A 9512 DF 3C     A           STX    BETAIU
00717A 9514 DF 11     A           STX    DZAU
00718A 9516 97 F4     A           STAA   STRIG
00719A 9518 4F           SCANCB   CLRA
00720A 9519 97 4B     A           STAA   CONRES
00721A 951B 96 12     A           LDAA   DZAL
00722A 951D D6 11     A           LDAB   DZAU
00723A 951F 27 08 9529            BEQ    SCANCD
00724A 9521 54           SCANCE   LSRB
00725A 9522 46                    RORA
00726A 9523 7C 004B   A           INC    CONRES
00727A 9526 5D                    TSTB
00728A 9527 26 F8 9521            BNE    SCANCE
00729A 9529 97 4A     A  SCANCD   STAA   CONE
00730A 952B 96 3D     A           LDAA   BETAIL
00731A 952D D6 3C     A           LDAB   BETAIU
```

```
00732A 952F 9B 16     A            ADDA    PSADL
00733A 9531 D9 15     A            ADCB    PSADU
00734A 9533 7E 925A   A            JMP     SCANSB
00735A 9536 BD 955A   A  SCAND     JSR     HELIXA     HELICAL SCAN SUBRTN
00736A 9539 26 08 9543            BNE      SCANDA     BRIF NOT RDY FOR EL UPDATE
00737A 953B CE 0000   A            LDX     #0
00738A 953E DF 51     A            STX     KCNTRU
00739A 9540 7E 9099   A            JMP     SCAN2A     DO BIDIR. EL UPDATE
00740A 9543 7E 9036   A  SCANDA JMP        LINKUP     DONE
00741A 9546 BD 955A   A  SCANE     JSR     HELIXA     HELICAL SCAN SUBRTN
00742A 9549 26 0C 9557            BNE      SCANEB
00743A 954B CE 0000   A            LDX     #0
00744A 954E DF 51     A            STX     KCNTRU
00745A 9550 86 02     A            LDAA    #2
00746A 9552 97 4F     A            STAA    UPDOWN     SET EL MOTION=UP
00747A 9554 7E 913A   A            JMP     SCAN4A     DO EL UPDATE
00748A 9557 7E 9036   A  SCANEB JMP        LINKUP     DONE
00749A 955A 96 28     A  HELIXA LDAA       PASS
00750A 955C 2A 11 956F            BPL      HELIXB     BRIF NOT FIRST PASS
00751A 955E CE 0000   A            LDX     #0
00752A 9561 DF 53     A            STX     JCNTRU
00753A 9563 DF 51     A            STX     KCNTRU
00754A 9565 96 06     A            LDAA    SECSSL
00755A 9567 D6 05     A            LDAB    SECSSU
00756A 9569 54                    LSRB
00757A 956A 46                    RORA
00758A 956B 97 4E     A            STAA    SIZ2L
00759A 956D D7 4D     A            STAB    SIZ2U      SECTR. BND/2(EL)
00760A 956F DE 53     A  HELIXB LDX        JCNTRU
00761A 9571 08                    INX
00762A 9572 DF 53     A            STX     JCNTRU
00763A 9574 9C 07     A            CPX     PTMJU
00764A 9576 26 13 958B            BNE      HELIXC     BRIF NOT RDY FOR AZ UPDATE
00765A 9578 CE 0000   A            LDX     #0
00766A 957B DF 53     A            STX     JCNTRU
00767A 957D 96 21     A            LDAA    AZIL
00768A 957F D6 20     A            LDAB    AZIU
00769A 9581 9B 16     A            ADDA    PSADL      ADD DELTA AZ
00770A 9583 D9 15     A            ADCB    PSADU
00771A 9585 C4 0F     A            ANDB    #$0F
00772A 9587 97 21     A            STAA    AZIL
00773A 9589 D7 20     A            STAB    AZIU       SAVE AZ
00774A 958B DE 51     A  HELIXC LDX        KCNTRU
00775A 958D 08                    INX
00776A 958E DF 51     A            STX     KCNTRU
00777A 9590 9C 03     A            CPX     STMKU
00778A 9592 39                    RTS
00779A 9593 96 28     A  SCANG  LDAA       PASS
00780A 9595 2A 22 95B9            BPL      SCANGA
00781A 9597 CE 0000   A            LDX     #0
00782A 959A DF 53     A            STX     JCNTRU
00783A 959C DF 51     A            STX     KCNTRU
00784A 959E DF 3C     A            STX     BETAIU
00785A 95A0 DF 59     A            STX     AZREGU
00786A 95A2 DF 57     A            STX     RCOSU
00787A 95A4 DF 55     A            STX     RSINU
00788A 95A6 4F                    CLRA
00789A 95A7 97 4B     A            STAA    CONRES
00790A 95A9 96 12     A            LDAA    DZAL
00791A 95AB D6 11     A            LDAB    DZAU
00792A 95AD 27 08 95B7            BEQ      SCANGB
00793A 95AF 54          SCANGC LSRB
00794A 95B0 46                    RORA
00795A 95B1 7C 004B   A            INC     CONRES
00796A 95B4 5D                    TSTB
```

```
00797A 95B5 26 F8 95AF              BNE    SCANGC
00798A 95B7 97 4A    A  SCANGB STAA   CONE
00799A 95B9 DE 51    A  SCANGA LDX    KCNTRU
00800A 95BB 08                    INX             INC K
00801A 95BC DF 51    A             STX    KCNTRU
00802A 95BE 9C 03    A             CPX    STMKU
00803A 95C0 26 19 95DB             BNE    SCANGD
00804A 95C2 CE 0000  A             LDX    #0
00805A 95C5 DF 51    A             STX    KCNTRU
00806A 95C7 96 5A    A             LDAA   AZREGL
00807A 95C9 D6 59    A             LDAB   AZREGU
00808A 95CB 9B 0A    A             ADDA   SSADL
00809A 95CD D9 09    A             ADCB   SSADU
00810A 95CF C1 10    A             CMPB   #$10
00811A 95D1 2B 02 95D5             BMI    SCANGE
00812A 95D3 97 F4    A             STAA   STRIG
00813A 95D5 C4 0F    A  SCANGE ANDB   #$0F
00814A 95D7 97 5A    A             STAA   AZREGL
00815A 95D9 D7 59    A             STAB   AZREGU
00816A 95DB DE 53    A  SCANGD LDX    JCNTRU
00817A 95DD 08                    INX             INC J
00818A 95DE DF 53    A             STX    JCNTRU
00819A 95E0 9C 07    A             CPX    PTMJU
00820A 95E2 26 10 95F4             BNE    SCANGF
00821A 95E4 CE 0000  A             LDX    #0
00822A 95E7 DF 53    A             STX    JCNTRU
00823A 95E9 96 3D    A             LDAA   BETAIL
00824A 95EB D6 3C    A             LDAB   BETAIU
00825A 95ED 9B 16    A             ADDA   PSADL
00826A 95EF D9 15    A             ADCB   PSADU
00827A 95F1 BD 9268  A             JSR    CONICL
00828A 95F4 DE 55    A  SCANGF LDX    RSINU
00829A 95F6 DF 22    A             STX    ELVIU
00830A 95F8 96 5A    A             LDAA   AZREGL
00831A 95FA D6 59    A             LDAB   AZREGU
00832A 95FC 9B 58    A             ADDA   RCOSL
00833A 95FE D9 57    A             ADCB   RCOSU
00834A 9600 2B 02 9604             BMI    SCANGG
00835A 9602 C4 0F    A             ANDB   #$0F
00836A 9604 97 21    A  SCANGG STAA   AZIL
00837A 9606 D7 20    A             STAB   AZIU
00838A 9608 7E 9036  A             JMP    LINKUP
00839                              END
```

APPENDIX III

| ADDR | \-0 | \-1 | \-2 | \-3 | \-4 | \-5 | \-6 | \-7 | \-8 | \-9 | \-A | \-B | \-C | \-D | \-E | \-F | |
|---|---|---|---|---|---|---|---|---|---|---|---|---|---|---|---|---|---|
| 000 | 00 | 01 | 01 | 03 | 05 | 07 | 09 | 0B | 0E | 10 | 12 | 14 | 17 | 1A | 1E | 21 | PATTERN 0 |
| 010 | 24 | 28 | 2C | 30 | 35 | 3D | 44 | 49 | 4D | 4E | 4F | 4F | 4F | 4E | 4A | 46 | |
| 020 | 42 | 3F | 3D | 3B | 3A | 38 | 37 | 37 | 36 | 36 | 36 | 37 | 38 | 3A | 3C | 43 | |
| 030 | 46 | 48 | 49 | 4A | 4A | 4B | 4B | 4A | 4A | 49 | 48 | 48 | 47 | 46 | 45 | 45 | |
| 040 | 44 | 43 | 42 | 42 | 42 | 42 | 42 | 42 | 42 | 43 | 43 | 44 | 45 | 46 | 47 | 48 | |
| 050 | 49 | 4A | 4B | 4C | 4C | 4D | 4D | 4D | 4D | 4D | 4D | 4C | 4C | 4B | 4B | | |
| 060 | 4C | 4C | 4D | 4E | 4F | 51 | 53 | 56 | 57 | 58 | 58 | 57 | 55 | 53 | 51 | 50 | |
| 070 | 4F | 4E | 4E | 4E | 4E | 4E | 4E | 4E | 4E | 4F | 4F | 4F | 4F | 4F | 4F | | |
| 080 | 50 | 50 | 50 | 50 | 50 | 50 | 51 | 52 | 54 | 55 | 56 | 57 | 57 | 58 | 58 | 59 | |
| 090 | 5A | 5C | 5D | 5F | 5F | 5F | 5E | 5D | 5B | 5A | 59 | 58 | 58 | 57 | 58 | 58 | |
| 0A0 | 59 | 5A | 5B | 5C | 5C | 5B | 5B | 5A | 5A | 5A | 59 | 57 | 56 | 55 | 53 | 52 | |
| 0B0 | 51 | 50 | 50 | 50 | 51 | 52 | 52 | 51 | 51 | 51 | 51 | 51 | 53 | 55 | 5A | 5F | |
| 0C0 | 60 | 62 | 61 | 60 | 5F | 5F | 5F | 60 | 61 | 62 | 64 | 66 | 68 | 6A | 6A | 6B | |
| 0D0 | 6B | 6A | 6A | 69 | 68 | 68 | 67 | 67 | 68 | 69 | 6A | 6B | 6C | 6D | 6D | 6D | |
| 0E0 | 6F | 71 | 71 | 71 | 71 | 71 | 70 | 6F | 6F | 70 | 70 | 70 | 70 | 70 | 70 | 70 | |
| 0F0 | 70 | 70 | 71 | 71 | 70 | 70 | 6E | 6D | 6C | 6C | 6B | 6A | 67 | 65 | 63 | 61 | |
| 100 | 60 | 5F | 61 | 65 | 6C | 6E | 6E | 6D | 6C | 6C | 6D | 6D | 6E | 6F | 70 | 71 | |
| 110 | 70 | 70 | 6F | 70 | 71 | 71 | 6F | 6F | 6F | 6E | 6E | 70 | 71 | 71 | 70 | 6E | |
| 120 | 6F | 70 | 71 | 71 | 71 | 6F | 6F | 6D | 6C | 6C | 6D | 6F | 6F | 70 | 71 | 71 | |
| 130 | 71 | 70 | 70 | 70 | 70 | 71 | 70 | 6F | 6F | 6F | 6D | 6E | 6F | 6F | 70 | 71 | |
| 140 | 71 | 71 | 71 | 6F | 6F | 6F | 70 | 70 | 6E | 6A | 69 | 67 | 68 | 6C | 70 | 70 | |
| 150 | 70 | 71 | 71 | 71 | 71 | 70 | 6F | 70 | 70 | 71 | 71 | 70 | 6F | 6F | 6F | 6E | |
| 160 | 6F | 70 | 70 | 71 | 71 | 71 | 70 | 6F | 6F | 6F | 6F | 6E | 6E | 6E | 6D | 6D | |
| 170 | 6B | 6B | 6B | 6B | 6C | 6D | 6F | 71 | 71 | 70 | 6E | 6F | 6E | 69 | 68 | 67 | |
| 180 | 68 | 69 | 71 | 70 | 70 | 70 | 6E | 6E | 6E | 6D | 6F | 6F | 70 | 70 | 70 | 70 | |
| 190 | 70 | 70 | 71 | 71 | 71 | 71 | 71 | 71 | 71 | 70 | 70 | 6F | 6E | 6D | 6F | 71 | |
| 1A0 | 71 | 71 | 70 | 6D | 6C | 6D | 6E | 6C | 69 | 6A | 6B | 6C | 6C | 71 | 71 | 71 | |
| 1B0 | 71 | 71 | 70 | 70 | 71 | 71 | 71 | 70 | 6F | 6B | 68 | 67 | 6B | 6B | 70 | 71 | |
| 1C0 | 71 | 71 | 71 | 71 | 71 | 70 | 70 | 70 | 6F | 70 | 6F | 71 | 71 | 71 | 70 | 70 | |
| 1D0 | 70 | 6F | 6F | 70 | 71 | 71 | 71 | 70 | 6F | 6E | 6E | 6D | 6D | 6D | 6B | 6B | |
| 1E0 | 6C | 6D | 6E | 6F | 6E | 70 | 71 | 71 | 71 | 71 | 71 | 71 | 71 | 70 | 6F | 6E | |
| 1F0 | 6E | 6D | 6B | 6C | 6D | 6C | 6B | 6B | 6B | 6D | 6E | 6F | 6F | 6D | 6B | 68 | |
| | \-0 | \-1 | \-2 | \-3 | \-4 | \-5 | \-6 | \-7 | \-8 | \-9 | \-A | \-B | \-C | \-D | \-E | \-F | |

| ADDR | DATA | | | | | | | | | | | | | | | | |
|---|---|---|---|---|---|---|---|---|---|---|---|---|---|---|---|---|
| | -0 | -1 | -2 | -3 | -4 | -5 | -6 | -7 | -8 | -9 | -A | -B | -C | -D | -E | -F | |
| 200 | 62 | 61 | 66 | 6B | 70 | 71 | 70 | 6F | 71 | 6F | 71 | 71 | 71 | 71 | 71 | 71 | PATTERN 0 cont'd |
| 210 | 70 | 6E | 70 | 71 | 71 | 70 | 70 | 70 | 6E | 6E | 70 | 71 | 71 | 71 | 71 | 71 | |
| 220 | 71 | 71 | 6F | 6F | 6F | 6F | 6D | 6E | 6F | 6E | 71 | 71 | 71 | 71 | 71 | 71 | |
| 230 | 71 | 6F | 6F | 6F | 6D | 6D | 6E | 71 | 71 | 71 | 71 | 71 | 6F | 6E | 71 | 71 | |
| 240 | 71 | 71 | 71 | 71 | 70 | 71 | 71 | 71 | 71 | 71 | 71 | 71 | 71 | 71 | 71 | 71 | |
| 250 | 71 | 71 | 71 | 71 | 71 | 71 | 71 | 71 | 71 | 71 | 71 | 71 | 71 | 71 | 71 | 71 | |
| 260 | 71 | 71 | 70 | 6F | 70 | 70 | 71 | 71 | 71 | 71 | 71 | 71 | 71 | 6F | 6F | 6E | |
| 270 | 6F | 70 | 71 | 71 | 71 | 71 | 71 | 6F | 6D | 6C | 6C | 6C | 6E | 6B | 6C | 6C | |
| 280 | 5E | 69 | 6C | 6E | 71 | 70 | 6C | 70 | 71 | 71 | 6F | 6E | 6B | 6D | 70 | 71 | |
| 290 | 00 | 00 | 00 | 01 | 01 | 02 | 04 | 07 | 09 | 0D | 11 | 19 | 20 | 28 | 2F | 35 | PATTERN 1 |
| 2A0 | 3E | 39 | 36 | 33 | 33 | 34 | 39 | 41 | 46 | 4B | 50 | 56 | 52 | 46 | 41 | 3F | |
| 2B0 | 40 | 45 | 4D | 56 | 5E | 5B | 51 | 44 | 3D | 3B | 3A | 3F | 47 | 51 | 58 | 5E | |
| 2C0 | 5B | 56 | 54 | 53 | 55 | 59 | 5E | 66 | 6B | 61 | 58 | 52 | 4F | 4C | 4C | 4D | |
| 2D0 | 50 | 54 | 56 | 57 | 56 | 55 | 54 | 55 | 56 | 57 | 59 | 5E | 61 | 63 | 65 | 60 | |
| 2E0 | 5B | 55 | 51 | 50 | 4F | 50 | 53 | 57 | 59 | 5A | 5A | 59 | 58 | 59 | 5A | 5D | |
| 2F0 | 61 | 65 | 68 | 6A | 6A | 69 | 63 | 60 | 5C | 5B | 59 | 59 | 58 | 5A | 5F | 63 | |
| 300 | 64 | 65 | 64 | 64 | 63 | 63 | 63 | 62 | 63 | 65 | 66 | 68 | 68 | 68 | 67 | 66 | |
| 310 | 65 | 64 | 64 | 64 | 64 | 65 | 66 | 6A | 6D | 6D | 6D | 6C | 69 | 66 | 65 | 65 | |
| 320 | 66 | 67 | 68 | 69 | 6A | 6B | 6B | 6C | 6C | 6C | 6D | 6E | 70 | 71 | 71 | 71 | |
| 330 | 70 | 6F | 6F | 6E | 6E | 6E | 6F | 6F | 70 | 70 | 71 | 71 | 71 | 71 | 71 | 71 | |
| 340 | 71 | 71 | 71 | 71 | 71 | 71 | 71 | 71 | 71 | 71 | 71 | 71 | 71 | 71 | 71 | 71 | |
| 350 | 71 | 71 | 71 | 70 | 6E | 6C | 6B | 6A | 6A | 6A | 69 | 68 | 68 | 69 | 6B | 6D | |
| 360 | 6E | 6F | 6F | 70 | 71 | 71 | 71 | 71 | 71 | 71 | 71 | 71 | 71 | 71 | 71 | 71 | |
| 370 | 6E | 6C | 6B | 6A | 6A | 6A | 6B | 6D | 6E | 6D | 6B | 6A | 68 | 67 | 65 | 64 | |
| 380 | 64 | 64 | 63 | 62 | 61 | 60 | 5F | 5F | 60 | 61 | 61 | 60 | 60 | 5F | 5F | 5F | |
| 390 | 5F | 60 | 64 | 66 | 64 | 63 | 63 | 6A | 6F | 6F | 6D | 6A | 67 | 68 | 6B | 6E | |
| 3A0 | 6D | 69 | 69 | 6D | 6F | 71 | 71 | 71 | 71 | 71 | 71 | 71 | 71 | 71 | 71 | 71 | |
| 3B0 | 71 | 71 | 71 | 71 | 71 | 71 | 71 | 6E | 6B | 6A | 6C | 6C | 6C | 6D | 6E | 71 | |
| 3C0 | 71 | 71 | 71 | 71 | 71 | 71 | 71 | 70 | 6E | 6D | 6D | 6E | 6E | 70 | 71 | 71 | |
| 3D0 | 70 | 71 | 71 | 71 | 71 | 71 | 71 | 70 | 6E | 6D | 6C | 6D | 6E | 6F | 71 | 71 | |
| 3E0 | 71 | 71 | 71 | 71 | 71 | 71 | 70 | 6A | 66 | 66 | 67 | 65 | 64 | 65 | 69 | 71 | |
| 3F0 | 71 | 71 | 70 | 71 | 71 | 71 | 71 | 71 | 71 | 71 | 71 | 71 | 71 | 71 | 71 | 71 | |
| | -0 | -1 | -2 | -3 | -4 | -5 | -6 | -7 | -8 | -9 | -A | -B | -C | -D | -E | -F | |

| ADDR | -0 | -1 | -2 | -3 | -4 | -5 | -6 | -7 | -8 | -9 | -A | -B | -C | -D | -E | -F | |
|------|----|----|----|----|----|----|----|----|----|----|----|----|----|----|----|----|--|
| 400 | 70 | 6E | 6A | 65 | 66 | 6B | 6A | 65 | 65 | 65 | 62 | 60 | 5F | 66 | 6C | 6F | PATTERN 1 cont'd |
| 410 | 71 | 71 | 71 | 70 | 70 | 70 | 6F | 70 | 70 | 70 | 70 | 71 | 71 | 70 | 70 | 6F | |
| 420 | 6E | 6E | 6E | 6E | 6F | 6F | 6F | 70 | 70 | 70 | 71 | 71 | 71 | 70 | 70 | 6F | |
| 430 | 6E | 6D | 6D | 6D | 6E | 6D | 6B | 6A | 68 | 65 | 65 | 66 | 67 | 68 | 6D | 71 | |
| 440 | 71 | 71 | 71 | 71 | 71 | 70 | 70 | 70 | 6F | 6F | 71 | 71 | 71 | 71 | 6E | 6E | |
| 450 | 6F | 70 | 71 | 71 | 71 | 6F | 68 | 69 | 69 | 68 | 69 | 6D | 70 | 71 | 71 | 70 | |
| 460 | 71 | 70 | 6F | 6F | 71 | 6F | 6F | 6F | 70 | 71 | 70 | 6E | 6D | 6F | 6D | 6B | |
| 470 | 69 | 6C | 6B | 6C | 6B | 69 | 6A | 6F | 71 | 71 | 71 | 71 | 71 | 6F | 6E | 6E | |
| 480 | 6F | 71 | 71 | 71 | 70 | 6E | 6E | 6E | 6E | 6B | 6A | 6A | 68 | 63 | 5D | 5E | |
| 490 | 60 | 61 | 61 | 6B | 6E | 6C | 6D | 6C | 6C | 70 | 71 | 71 | 71 | 71 | 71 | 71 | |
| 4A0 | 71 | 71 | 71 | 71 | 70 | 6E | 6F | 6F | 70 | 70 | 6E | 6C | 6C | 6C | 6B | 71 | |
| 4B0 | 71 | 71 | 71 | 71 | 71 | 71 | 71 | 68 | 64 | 68 | 6A | 6F | 71 | 71 | 71 | 71 | |
| 4C0 | 71 | 71 | 71 | 71 | 71 | 71 | 6F | 6C | 6C | 6C | 6E | 71 | 71 | 71 | 71 | 71 | |
| 4D0 | 71 | 71 | 6D | 6B | 6C | 6D | 6C | 6C | 70 | 71 | 71 | 71 | 71 | 70 | 6F | 70 | |
| 4E0 | 70 | 71 | 71 | 71 | 71 | 71 | 71 | 71 | 71 | 70 | 70 | 70 | 70 | 70 | 70 | 70 | |
| 4F0 | 6F | 6F | 6E | 71 | 71 | 71 | 71 | 71 | 71 | 71 | 71 | 71 | 71 | 6F | 71 | 71 | |
| 500 | 71 | 71 | 71 | 71 | 71 | 71 | 71 | 6E | 6A | 69 | 69 | 6A | 66 | 64 | 63 | 5C | |
| 510 | 5F | 63 | 66 | 69 | 6C | 6D | 6D | 6D | 6E | 6D | 6E | 6C | 6C | 6E | 6F | 71 | |
| 520 | FF | FF | FF | FF | FF | FF | FF | FF | FF | FF | FF | FF | FF | FF | FF | FF | |
| 530 | FF | FF | FF | FF | FF | FF | FF | FF | FF | FF | FF | FF | FF | FF | FF | FF | |
| 540 | FF | FF | FF | FF | FF | FF | FF | FF | FF | FF | FF | FF | FF | FF | FF | FF | |
| 550 | FF | FF | FF | FF | FF | FF | FF | FF | FF | FF | FF | FF | FF | FF | FF | FF | |
| 560 | FF | FF | FF | FF | FF | FF | FF | FF | FF | FF | FF | FF | FF | FF | FF | FF | |
| 570 | FF | FF | FF | FF | FF | FF | FF | FF | FF | FF | FF | FF | FF | FF | FF | FF | |
| 580 | FF | FF | FF | FF | FF | FF | FF | FF | FF | FF | FF | FF | FF | FF | FF | FF | |
| 590 | FF | FF | FF | FF | FF | FF | FF | FF | FF | FF | FF | FF | FF | FF | FF | FF | |
| 5A0 | FF | FF | FF | FF | FF | FF | FF | FF | FF | FF | FF | FF | FF | FF | FF | FF | |
| 5B0 | FF | FF | FF | FF | FF | FF | FF | FF | FF | FF | FF | FF | FF | FF | FF | FF | |
| 5C0 | FF | FF | FF | FF | FF | FF | FF | FF | FF | FF | FF | FF | FF | FF | FF | FF | |
| 5D0 | FF | FF | FF | FF | FF | FF | FF | FF | FF | FF | FF | FF | FF | FF | FF | FF | |
| 5E0 | FF | FF | FF | FF | FF | FF | FF | FF | FF | FF | FF | FF | FF | FF | FF | FF | |
| 5F0 | FF | FF | FF | FF | FF | FF | FF | FF | FF | FF | FF | FF | FF | FF | FF | FF | |
| | -0 | -1 | -2 | -3 | -4 | -5 | -6 | -7 | -8 | -9 | -A | -B | -C | -D | -E | -F | |

What is claimed is:

1. Apparatus for synthesizing in real time a sequence of signal attenuation values corresponding to the line of sight intersection of the surface envelope of a three dimensional antenna radiation beam pattern sensed by a receiver selectively positioned in space relative to an RF source emitting said radiation pattern, comprising:

addressable memory means having at least one stored data set of a two dimensional planar cut of a generalized typical radiation pattern having certain predetermined characteristics, said cut being defined in terms of signal attenuation values as a function of angle off of beam center (boresight), and plural stored instruction sequences of a plurality of different scanning motions;

input means for inputting a set of operational parameter values for a desired type of antenna pattern which is symmetrical about boresight and which has a selected beamwidth and scanning motion;

signal processor means coupled to said input means and being responsive to said set of parameter values to sequentially address a selected one of said plural data sets in said memory means in successive operational time intervals to generate respective angle values of the angle subtended by the line of sight between said receiver and source and the instant boresight direction for said selected scanning motion and thereafter address said memory means with said respective angle values;

said memory means being operable in response to said address in each operational time interval to provide a specific attenuation value; and output means for reading out a specific attenuation value in each operational time interval.

2. The apparatus as defined by claim 1 wherein said memory means comprises a digital memory and said attenuation values comprise respective digital words.

3. The apparatus as defined by claim 2 wherein said output means includes an interpolation circuit operable to incrementally step the value of said digital words from one specific attenuation value to another in each operational time interval.

4. The apparatus as defined by claim 3 wherein said interpolation circuit includes an up/down counter which is operable at a variable clock rate to incrementally step in equal amplitude values from one attenuation value to another and wherein said clock rate is determined by the difference in value between successive attenuation values.

5. The apparatus as defined by claim 4 wherein for every $i_{th}$ operational time interval the interpolation circuit is responsive to the attenuation values provided during the $i-1_{th}$ and $i-2_{th}$ operational time intervals.

6. The apparatus as defined by claim 1 wherein said signal processor means comprises a digital signal processor and wherein said angle values are initially generated in azimuth and elevational coordinate values and thereafter resolved into a single angle for addressing said memory means.

7. Apparatus for synthesizing in real time a sequence of beam surface attenuation values corresponding to the line of sight intersection of the surface envelope of a three dimensional antenna radiation beam pattern sensed by a receiver selectively positioned in space relative to an RF source emitting said radiation pattern, comprising:

addressable digital memory means having at least one stored data set of a two dimensional planar cut of an illustrative radiation pattern having certain predetermined characteristics said cut being defined in terms of attenuation values as a function of angle off of boresight and having respective stored data sets of instantaneous angular values in azimuth ($AZ_i$) and elevation ($EL_i$) for a polarity of selectable different scanning motions;

input means for initially inputting a first set of parameters for generating a desired type of antenna pattern having a predetermined beamwidth in both azimuth and elevation and a predetermined boresight scanning motion and subsequentially, during successive operational time intervals, inputting a second set of parameters corresponding to angle values in azimuth (AZOF) and elevation (ELOF) of the angular offset between the line of sight between the receiver and source and the center of the boresight sweep for a selected scanning motion;

timer circuit means producing a train of clock signals for defining and controlling said operational time interval;

signal processor means coupled to said input means, being controlled by said timer circuit means and operable to address a predetermined scanning motion stored data set in said memory means during each operational time interval which outputs to said processor means said instantaneous azimuth and elevation angles $AZ_i$ and $EL_i$, being thereafter operable to generate respective difference angle values $OBAZ_i$ and $OBEL_i$ from said angular offset values AZOF and ELOF, and to generate a square root of the sum of the squares angular value $\theta$ from said difference angle values and the respective beamwidth factor parameters in azimuth (BWAZ) and elevation (BWEL) to provide a lookup address signal, said memory means being operable in response to said lookup address signal to address said stored data set of said two dimensional planar cut to provide a specific attenuation digital word during each operational time interval; and output means for reading out a specific attenuation value from said memory means in each operational time interval.

8. The apparatus as defined by claim 7 and additionally including second timer circuit means for producing another train of clock signals, said another train of clock signals having a variable controlled repetition rate; and wherein said output means includes circuit means operable to output said attenuation word in incremental value steps between two successive attenuation words, and whereupon the repetition rate of said second timer circuit means is controlled in accordance with the difference value between said two successive attenuation words.

9. The apparatus as defined by claim 8 wherein said output means includes an up/down counter as controlled by said another train of clock signals.

10. The apparatus as defined by claim 8 wherein the attenuation word outputted in any $i_{th}$ operational time interval is the attenuation word generated between the previous $i-1_{th}$ and $i-2_{th}$ operational time intervals.

11. The apparatus as defined by claim 7 wherein said square root of the sum of the squares angular value is determined from the relationship $$\sqrt{\left(\frac{OBAZ_i}{BWAZ}\right)^2 + \left(\frac{OBEL_i}{BWEL}\right)^2}$$

12. The apparatus as defined in claim 7 wherein the beamwidth factor parameters BWAX and BWEL determine the degree of ellipticity of the synthesized radiation beam pattern.

13. The apparatus as defined by claim 7 wherein digital memory means additionally includes a second stored data set of a different two dimensional planar cut of another illustrative radiation pattern, and wherein said signal processor means is operable to address said second stored data set.

14. The apparatus as defined by claim 7 wherein said digital memory means comprises at least one programmable read only memory.

15. The apparatus as defined by claim 7 wherein said input means includes a random access memory coupled to programming means and adapted to feed said first and second sets of parameters to said signal processor means.

* * * * *